(12) United States Patent  
Matsuzaki

(10) Patent No.: US 7,692,834 B2  
(45) Date of Patent: Apr. 6, 2010

(54) IMAGE PROCESSING SYSTEM, IMAGE FORMING APPARATUS, CONTROL METHOD FOR THE SAME, AND PROGRAM FOR IMPLEMENTING THE CONTROL METHOD

(75) Inventor: Masanori Matsuzaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 1080 days.

(21) Appl. No.: 11/198,952

(22) Filed: Aug. 8, 2005

(65) Prior Publication Data

US 2006/0029293 A1 Feb. 9, 2006

(30) Foreign Application Priority Data

Aug. 6, 2004 (JP) ............................ 2004-231241

(51) Int. Cl.
*G06K 9/32* (2006.01)
(52) U.S. Cl. ..................... 358/528; 358/1.12; 358/1.18; 382/298
(58) Field of Classification Search ................ 358/1.18, 358/1.13, 528; 715/243, 251, 253; 345/667–672, 345/680–682; 382/298
See application file for complete search history.

(56) References Cited

U.S. PATENT DOCUMENTS

| 5,357,348 | A | * | 10/1994 | Moro | .......................... 358/450 |
| 5,642,473 | A | * | 6/1997 | Klotz, Jr. | ..................... 358/1.18 |
| 6,373,590 | B1 | * | 4/2002 | Ancin et al. | ................ 358/1.18 |
| 7,062,190 | B2 | * | 6/2006 | Miyamoto | ..................... 399/81 |
| 2002/0051230 | A1 | * | 5/2002 | Ohta | ........................... 358/448 |
| 2004/0012814 | A1 | * | 1/2004 | Tanaka et al. | ............... 358/1.18 |
| 2004/0095587 | A1 | * | 5/2004 | Brown et al. | .................. 358/1.2 |
| 2004/0109201 | A1 | * | 6/2004 | Teraue | ........................ 358/1.18 |

FOREIGN PATENT DOCUMENTS

JP 8-212365 A 8/1996

* cited by examiner

*Primary Examiner*—Benny Q Tieu
*Assistant Examiner*—Qian Yang
(74) *Attorney, Agent, or Firm*—Rossi, Kimms & McDowell LLP

(57) ABSTRACT

An image processing system that can remove unnecessary blank parts in print data, thereby achieving sheet saving and efficient print output at the time of printing and copying. Data is inputted to an information processing apparatus of the system, and at least one object is extracted from the data. Out of the extracted object, at least one object to be reduced or enlarged is designated, and then reduced or enlarged. The data including the reduced or enlarged object is searched to find at least one blank part in the data, and the reduced or enlarged object is moved to the found blank part. After the reduced or enlarged object has been moved, a blank part generated on the data is deleted from the data.

19 Claims, 17 Drawing Sheets

IMAGE PROCESSING SYSTEM, IMAGE FORMING APPARATUS, CONTROL METHOD FOR THE SAME, AND PROGRAM FOR IMPLEMENTING THE CONTROL METHOD

BACKGROUND OF THE INVENTION

1. Field of the Invention

The present invention relates to an image processing system, an image forming apparatus that constructs the image processing system, a control method for the same, and a program for implementing the control method, and in particular, to an image processing system, image forming apparatus, control method, and program that can automatically change the layout of print data when carrying out printing or copying.

2. Description of the Related Art

In recent years, SFPs (Single Function Printers) and MFPs (Multi Function Printers) that are image forming apparatuses with a print function have become more advanced in functionality, and various technologies relating to print layout (hereinafter simply referred to as "layout") have been incorporated in these kinds of apparatuses. Representative examples are a "2-in-1" function and a size reduction function used for printing or copying. Such functions make it possible to print out data using the lowest possible number of sheets, thus greatly contributing to sheet saving.

Aside from such technologies, a technology for adjusting the layout by reducing the interlinear space has also been proposed (see, for example, Japanese Laid-Open Patent Publication (Kokai) No. H08-212365). This technology enables a user to print out a document with a nice layout. In this way, technologies related to layout have been realized from a variety of approaches.

However, since the "2-in-1" function and reduction function mentioned above reduce the print-out size of all of the data, there is the problem that parts of particular importance in the data are not printed out at a favorable size. Also, the technology mentioned above that adjusts the layout cannot be easily applied for the purpose of sheet saving, since it involves fine adjustment such as interlinear space adjustment.

In addition, when a Web page displayed on a monitor of a PC (Personal Computer) is printed, there is the problem that many sheets are used up in printing out the required information due to the presence of many blank parts normally included on the Web page relative to real content parts to be printed. If the conventional sheet-saving technologies mentioned above are used to print a Web page, it is not possible to change the size ratio of the blank parts to the real content parts, and therefore a large saving of sheets cannot be achieved.

SUMMARY OF THE INVENTION

It is an object of the present invention to provide an image processing system, a control method therefor, and an image forming apparatus that can remove unnecessary blank parts in print data, thereby achieving sheet saving and efficient print output at the time of printing and copying, as well as a program for implementing the control method.

To attain the above object, in a first aspect of the present invention, there is provided an image processing system including at least one image forming apparatus, and at least one information processing apparatus, wherein data is transmitted from the information processing apparatus to the image forming apparatus, to carry out printing by the image forming apparatus based on the data, wherein the information processing apparatus comprises an input device that inputs data, an extracting device that extracts at least one object from the data inputted by the input device, a designating device that designates at least one object to be reduced or enlarged, out of the at least one extracted object, an object scaling device that reduces or enlarges the object designated by the designating device, a searching device that searches the data including the reduced or enlarged object to find at least one blank part in the data, an object moving device that moves the reduced or enlarged object to the found blank part, and a deleting device that deletes a blank part generated on the data from the data after the reduced or enlarged object has been moved.

According to the first aspect, unnecessary blank parts can be removed from print data and sheet saving and efficient print output can be achieved at the time of printing and copying.

Preferably, the information processing apparatus further comprises an attribute determining device that determines respective attributes of parts of the data inputted by the input device, and the extracting device generates at least one object from each of the respective parts of the data whose attributes have been determined by the determining device.

More preferably, the attribute determining device analyzes data obtained by rasterizing the inputted data and determines an attribute of each of at least one data part composing the rasterized data based on an image feature value of each of the at least one data part.

Alternatively, the data is PDL (Page Description Language) data, and the attribute determining device interprets the PDL data and determines an attribute of each of at least one data part composing the PDL data based on information written in the PDL data.

Preferably, the attribute determining device determines that the blank part has a blank attribute.

Even more preferably, the extracting device generates at least one blank object from the blank part determined as having the blank attribute.

More preferably, the searching device searches for the blank part by searching the blank object.

Preferably, the information processing apparatus further comprises an importance level setting device that sets an importance level of the object in advance in accordance with the attribute of the data part from which the object is generated, and the designating device designates the object to be reduced or enlarged in accordance with the importance level set by the importance level setting device.

Preferably, the image processing system further comprises a selecting device that selects an optimal object for movement to the found blank part, out of the at least one reduced or enlarged object, and a recalculating device that recalculates at least one blank object from the blank part generated on the data after the reduced or enlarged object has been moved.

Even more preferably, the blank object is rectangular in shape, and the deleting device deletes at least one blank object of a predetermined width out of the recalculated at least one blank object.

More preferably, the deleting device deletes a blank object, out of the recalculated at least one blank object, that is adjacent to an object having an attribute other than the blank attribute.

Preferably, the attribute determining device determines that, out of the parts of the data, at least one data part including characters has a character attribute and at least one data part including at least one figure has a figure attribute.

Preferably, the extracting device replaces an object, out of the extracted at least one object, that is smaller than a size set in advance, with a blank object.

To attain the above object, in a second aspect of the present invention, there is provided a control method for an image processing system including at least one image forming apparatus, and at least one information processing apparatus, wherein data is transmitted from the information processing apparatus to the image forming apparatus, to carry out printing by the image forming apparatus based on the data, the control method comprising an input step of inputting data, an extracting step of extracting at least one object from the data inputted in the input step, a designating step of designating at least one object to be reduced or enlarged, out of the extracted object, an object scaling step of reducing or enlarging the object designated in the designating step, a searching step of searching the data including the reduced or enlarged object to find at least one blank part in the data, an object moving step of moving the reduced or enlarged object to the found blank part, and a deleting step of deleting a blank part generated on the data from the data after the reduced or enlarged object has been moved.

Preferably, the control method for an image processing system further comprises an attribute determining step of determining respective attributes of parts of the data inputted in the input step, and in the extracting step, at least one object is generated from each of the respective parts of the data whose attributes have been determined in the determining step.

More preferably, in the attribute determining step, data obtained by rasterizing the inputted data is analyzed and an attribute of each of at least one data part composing the rasterized data is determined based on an image feature value of each of the at least one data part.

Alternatively, the data is PDL (Page Description Language) data, and in the attribute determining step, the PDL data is interpreted and an attribute of each of at least one data part composing the PDL data is determined based on information written in the PDL data.

Preferably, in the attribute determining step, it is determined that the blank part has a blank attribute.

More preferably, in the extracting step, at least one blank object is generated from the blank part determined as having the blank attribute.

Even more preferably, in the searching step, the blank part is searched for by searching the blank object.

Preferably, the control method for an image processing system further comprises an importance level setting step of setting an importance level of the object in advance in accordance with the attribute of data part from which the object is generated, and in the designating step, the object to be reduced or enlarged is designated in accordance with the importance level set in the importance level setting step.

Preferably, the control method for an image processing system further comprises a selecting step of selecting an optimal object for movement to the found blank part, out of the at least one reduced or enlarged object, and a recalculating step of recalculating at least one blank object from the blank part generated on the data after the reduced or enlarged object has been moved.

More preferably, the blank object is rectangular in shape, and in the deleting step, at least one blank object of a predetermined width out of the recalculated at least one blank object is deleted.

Even more preferably, in the deleting step, a blank object, out of the recalculated at least one blank object, that is adjacent to an object having an attribute other than the blank attribute, is deleted.

Preferably, in the attribute determining step, it is determined that, out of the parts of the data, at least one data part including characters has a character attribute and at least one data part including at least one figure has a figure attribute.

Preferably, in the extracting step, an object, out of the extracted at least one object, that is smaller than a size set in advance, is replaced with a blank object.

To attain the above object, in a third aspect of the present invention, there is provided a computer-readable program for causing a computer to execute a control method for an image processing system including at least one image forming apparatus, and at least one information processing apparatus, wherein data is transmitted from the information processing apparatus to the image forming apparatus, to carry out printing by the image forming apparatus based on the data, the program comprising an input module for inputting data, an extracting module for extracting at least one object from the data inputted by the input module, a designating module for designating at least one object to be reduced or enlarged, out of the extracted object, an object scaling module for reducing or enlarging the object designated by the designating module, a searching module for searching the data including the reduced or enlarged object to find at least one blank part in the data, an object moving module for moving the reduced or enlarged object to the found blank part, and a deleting module for deleting a blank part generated on the data from the data after the reduced or enlarged object has been moved.

To attain the above object, in a fourth aspect of the present invention, there is provided an image forming apparatus that carries out printing, comprising a data input device that inputs data, an extracting device that extracts at least one object from the data inputted by the data input device, a designating device that designates at least one object to be reduced or enlarged, out of the at least one object extracted by the extracting device, an object scaling device that reduces or enlarges the object designated by the designating device, a searching device that searches the data including the reduced or enlarged object to find at least one blank part in the data, an object moving device that moves the reduced or enlarged object to the found blank part, and a deleting device that deletes a blank part generated on the data from the data after the reduced or enlarged object has been moved.

Preferably, the image forming apparatus further comprises an attribute determining device that determines respective attributes of parts of the data inputted by the data input device, and the extracting device generates at least one object from each of the respective parts of the data whose attributes have been determined by the determining device.

More preferably, the attribute determining device removes noise that does not need to be printed from the analyzed data.

With this configuration, noise due to dirt and the like can never be misrecognized as an object, and therefore optimal changing of print layout can be carried and an increase in processing time can be avoided.

Preferably, the extracting device replaces an object, out of the extracted at least one object, that is smaller than a size set in advance, with a blank object.

With this configuration, the total number of objects in the data decreases and therefore the saving efficiency achieved by the layout change is raised. Also, since there are fewer objects to be moved, the processing time can be shortened.

To attain the above object, in a fifth aspect of the present invention, there is provided a control method for an image forming apparatus that carries out printing, the control method comprising a data inputting step of inputting data, an extracting step of extracting at least one object from the data inputted in the data inputting step, a designating step of designating at least one object to be reduced or enlarged, out of the at least one object extracted in the extracting step, an object scaling step of reducing or enlarging the object designated in the designating step, a searching step of searching the data including the reduced or enlarged object to find at least one blank part in the data, an object moving step of moving the reduced or enlarged object to the found blank part, and a deleting step of deleting a blank part generated on the data from the data after the reduced or enlarged object has been moved.

To attain the above object, in a sixth aspect of the present invention, there is provided a computer-readable program for causing a computer to execute a control method for an image forming apparatus that carries out printing, the program comprising a data inputting module for inputting data, an extracting module for extracting at least one object from the data inputted by the data input module, a designating module for designating at least one object to be reduced or enlarged, out of the at least one object extracted by the extracting module, an object scaling module for reducing or enlarging the object designated by the designating module, a searching module for searching the data including the reduced or enlarged object to find at least one blank part in the data, an object moving module for moving the reduced or enlarged object to the found blank part, and a deleting module for deleting a blank part generated on the data from the data after the reduced or enlarged object has been moved.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1:
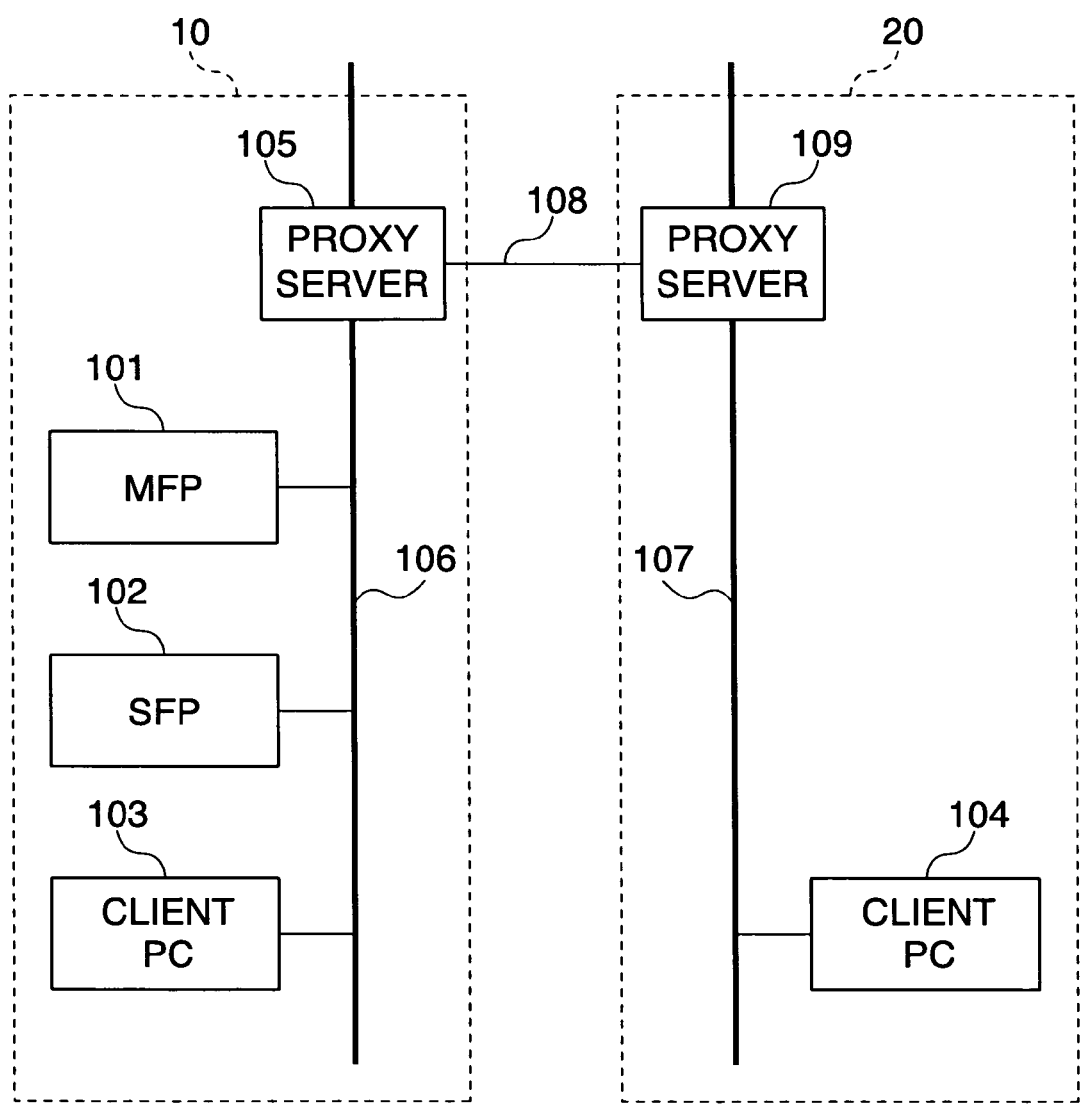
FIG. 1 is a block diagram showing the overall construction of an image processing system according to a first embodiment of the present invention.

FIG. 1 is a block diagram showing the overall construction of an image processing system according to a first embodiment of the present invention.

Referring to FIG. 1, the image processing system is realized in an example environment where an office 10 and an office 20 as offices of a company or the like are connected via the Internet 108.

A MFP (Multi-Function Printer) 101 with a plurality of functions such as a print function, a copy function, and a facsimile function, a SFP (Single-Function Printer) 102 with only a print function, a client PC 103, and a proxy server 105 are connected to a LAN 106 constructed in the office 10.

On the other hand, a client PC 104 and a proxy server 109 are connected to a LAN 107 constructed in the office 20.

The LANs 106 and 107 are connected to each other via the Internet 108 through the proxy servers 105 and 109. The proxy server 105 collectively controls access to and from the LAN 106 to permit only special types of outgoing connections from the LAN 106 and block unauthorized incoming access from outside. The proxy server 109 has the same function as that of the proxy server 105.

The client PCs 103 and 104 are Personal Computers which are used by users to generate and edit image data and are each comprised of a CPU, a RAM, a ROM, a hard disk drive, an operating section such as a keyboard and a mouse, and a monitor.

The client PCs 103 and 104 each include a printer driver that controls a printing operation of the MFP 101 or the SFP 102. The printer driver incorporates a control program for automatically changing a print layout when image data is converted to print data, and has functions for performing ON/OFF-switching of the automatic print layout changing and for displaying changes in settings associated therewith.

The MFP 101 and the SFP 102 receive print data outputted from the client PC 103 (or the client PC 104) and perform printing output of images based on the print data. In particular, the MFP 101 includes an image reading apparatus, described later, and in accordance with a user operation, reads an image of an original placed on an auto document feeder (ADF) or a platen glass and copies the original.

Figure 2:
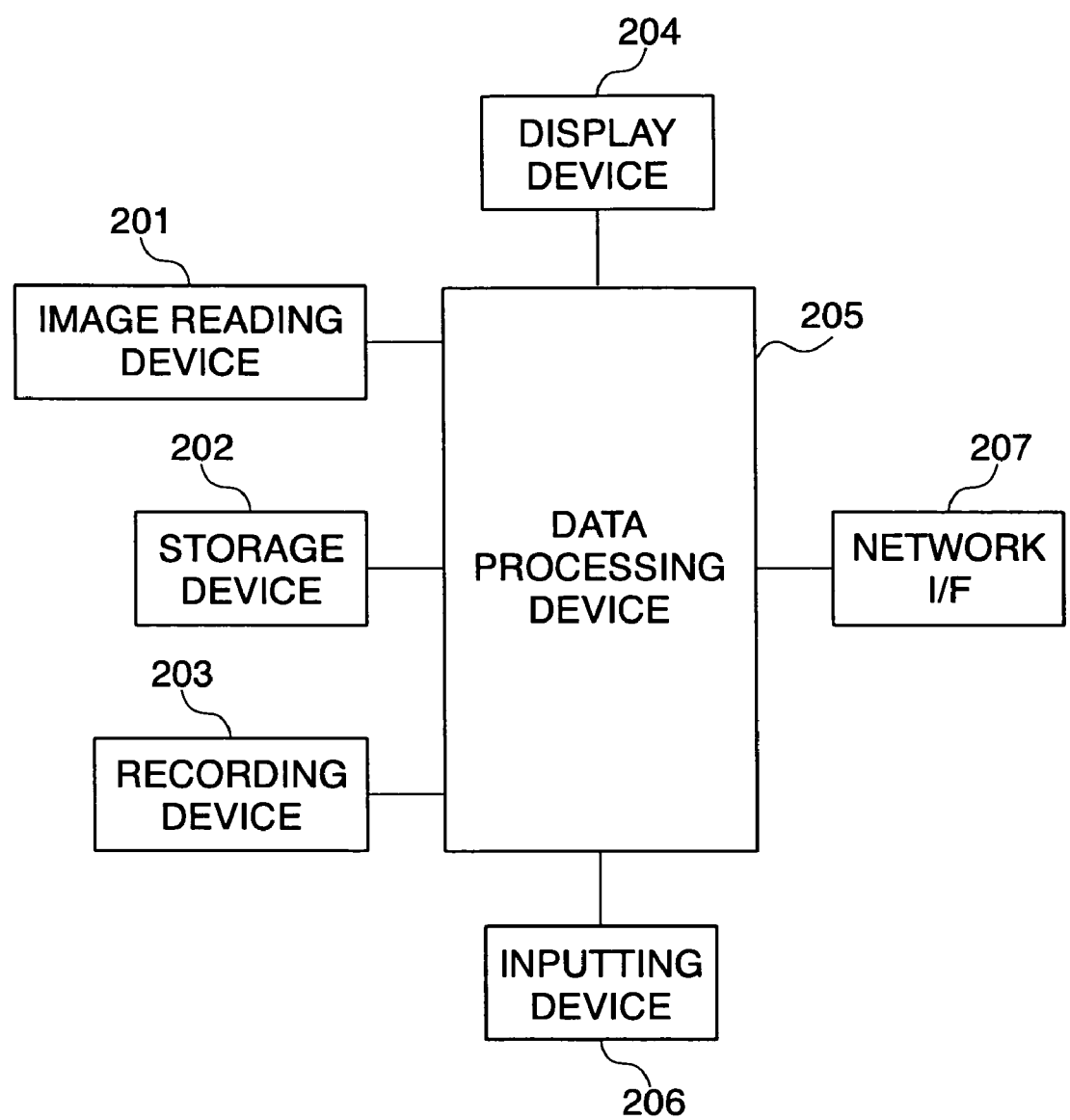
FIG. 2 is a block diagram showing the internal construction of a MFP appearing in FIG. 1.

FIG. 2 is a block diagram showing the internal construction of the MFP 101 appearing in FIG. 1.

As shown in FIG. 2, the MFP 101 is comprised of an image reading device 201 that includes an ADF and reads an image of an original, a storage device 202 implemented by a hard disk drive or the like that stores image data read by the image reading device 201 and print data received from the client PC 103 or the like, a recording device 203 that forms (records) an image on a sheet, a display device 204 implemented by a liquid crystal display or the like, a data processing device 205, an input device 206 that includes a key operating section, and a network I/F 207 for connecting to the LAN 106.

The image reading device 201 irradiates an original placed on the ADF or the platen glass using a light source, not shown, whereby light reflected from the original forms an image through a lens on a solid-state image pickup device, from which a rasterized image reading signal is outputted as an image signal of a predetermined resolution (for example, 600 dpi).

As the copy function, the MFP 101 converts the image signal outputted from the image reading device 201 into recording data (image data) using the data processing device 205 and sequentially outputs the recording data to the recording device 203 to carry out image formation on sheets. When making multiple copies of an original, one page of recording data is temporarily stored in the storage device 202 and then the stored data is repeatedly outputted to the recording device 203 to carry out image formation on sheets.

A copy instruction is given to the MFP 101 by the user operating the key operating section provided on the MFP 101, whereby the series of operations described above is controlled by a control section (CPU), not shown, inside the data processing device 205. The state of operation input and image data being processed are displayed by the display device 204.

The MFP 101 receives image data transmitted from the client PC 103 (or the client PC 104) via the LAN 106 using the network I/F 207, and after the data processing device 205 has converted the image data into raster data, the recording device 203 carries out image formation on a sheet based on the raster data.

On the other hand, the SFP 102 has the same internal construction as the MFP 101 shown in FIG. 2 with only the image reading device 201 being omitted, and the SFP 102 is thus equipped only with a function for converting image data received via the LAN 106 by the network I/F 207 into raster data and carrying out image formation on a sheet.

Next, an automatic print layout changing process carried out by the image processing system will be described.

The automatic print layout changing process searches print data for blank parts (blank objects) where there are no figures and/or characters to be printed and places figures ("figure" objects) and/or character ("character" objects) into such blank parts to make the layout more efficient, thereby saving sheets.

Figure 3:
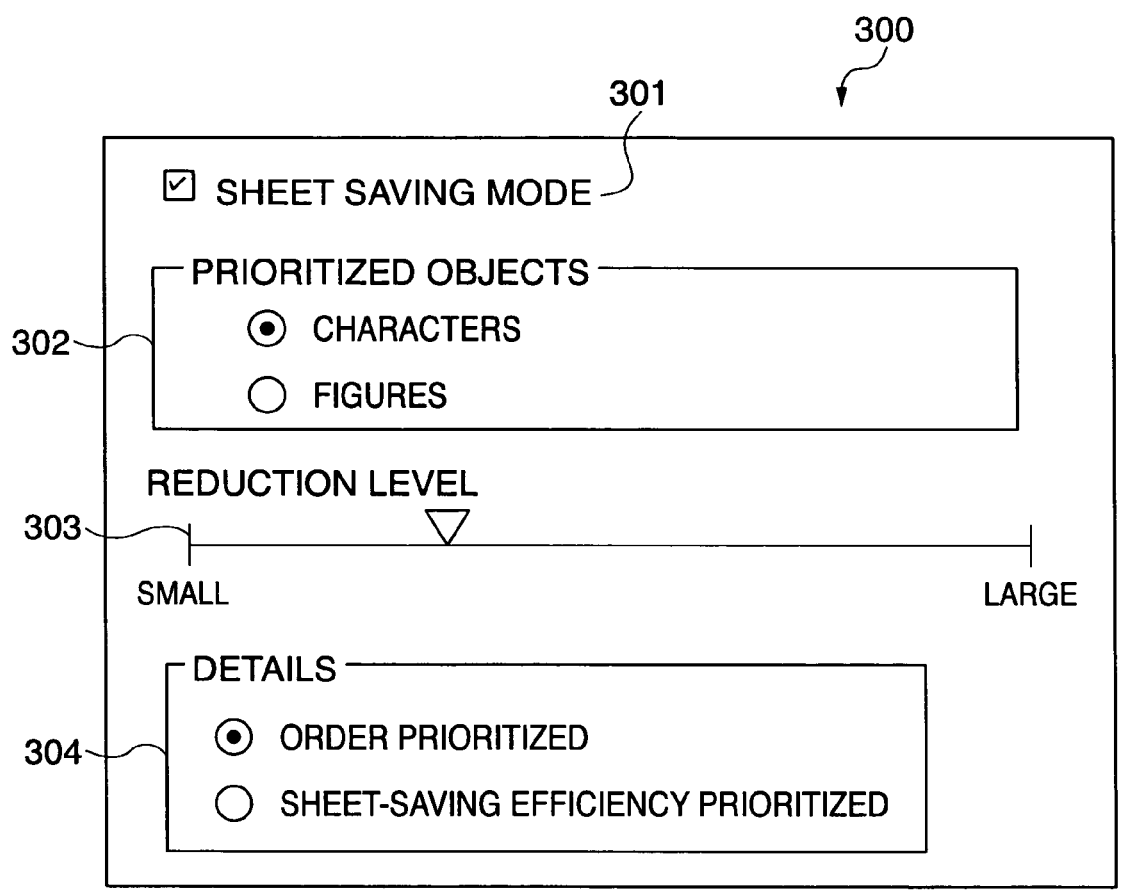
FIG. 3 is a view showing one example of a UI screen displayed on a client PC appearing in FIG. 1.

When transmitting image data generated on the client PC 103 (or the client PC 104) to the MFP 101 or the SFP 102 to print the image data, the user activates the printer driver to have a UI screen as shown in FIG. 3 displayed and then turns the automatic print layout changing process on or off and/or changes settings.

FIG. 3 is a view showing one example of the UI screen displayed by the printer driver installed in the client PCs 103 and 104 appearing in FIG. 1.

When the printer driver is activated, the client PC 103 (or client PC 104) causes the UI screen 300 to be displayed on the monitor. In the UI screen 300, by using a "sheet saving mode" checkbox 301, the user is allowed to set whether or not sheet saving is to be carried out. That is, if the user places a check in the "sheet-saving mode" checkbox 301, automatic print layout changing to save sheets becomes valid.

By placing a check in either a "characters" radio button or a "figures" radio button in a selection box for "prioritized objects" 302, it is possible for the user to designate which of "characters" and "figures" should be given priority during automatic layout changing and during printing. By doing so, the "prioritized objects" can be automatically set during the automatic print layout changing. That is, by selecting the "prioritized objects" on the UI screen, the user not only sets in advance which objects are of higher importance during the automatic layout changing and moreover during printing, but also designates objects other than the "prioritized objects" as objects to be reduced in size during automatic layout changing and during printing. When, as shown in FIG. 3, a setting is made to carry out layout with priority given to "characters", objects other than the character objects are designated to be reduced in size. Conversely, when a setting is made to carry out layout with priority given to "figures", objects other than the figure objects are designated to be reduced in size. The objects not selected as "prioritized objects" have a lower importance during the layout and during printing and are reduced in size in accordance with a reduction ratio set by a "reduction level" bar 303.

By selecting "order prioritized" or "sheet-saving prioritized" in a "details" selection box 304, the user can set whether the automatic print layout changing should be carried out with "order prioritized" or with "sheet-saving prioritized". Here, when the "order prioritized" has been selected, greater importance is given to an order, described later, than sheet-saving efficiency for blank parts in the print layout, whereas when "sheet-saving prioritized" has been selected, greater importance is given to the sheet-saving efficiency for blank parts in the print layout than the order mentioned above.

It should be noted that the respective items to be displayed on the UI screen 300 are not limited to the items described above, and various items may be displayed depending on an algorithm used for the automatic layout changing. For example, the "priority objects" 302 can be set attribute-by-attribute basis such as "characters" and "figures" as shown in FIG. 3, however, the setting is not limited to this.

Also, the UI screen 300 may be displayed as part of a print settings screen or may be displayed on the monitor as a pop-up screen.

Next, the automatic print layout changing process carried out during printing will be described.

Figure 4:
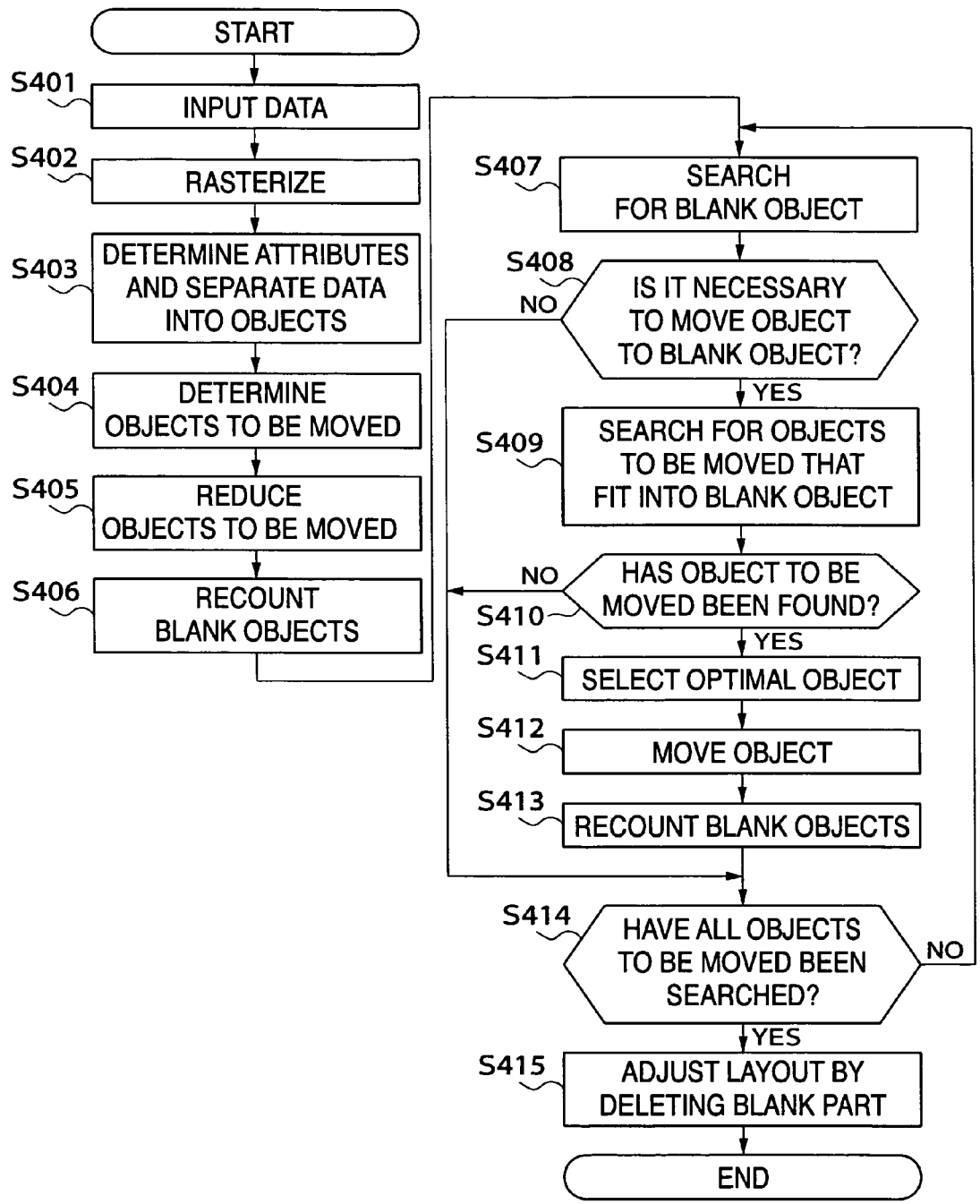
FIG. 4 is a flowchart showing the procedure of an automatic print layout changing process carried out by the image processing system shown in FIG. 1.

FIG. 4 is a flowchart showing the procedure of the automatic print layout changing process carried out by the image processing system shown in FIG. 1 during printing.

As shown in FIG. 4, in a step S401, image data (hereinafter simply referred to as "data") including figures and characters is inputted. Here, it is assumed that data generated on the client PC 103 and stored in the hard disk drive of the client PC 103, for example, is read out from the hard disk drive by the data processing device 205 of the MFP 101. Note that the manner of data input is not limited to this. For example, data received from the image reading device 201 of the MFP 101 or data received from the client PC 104 via the network may be inputted to the data processing device 205 of the MFP 101. Although the above data includes characters and figures, the data is not limited to this and may include tables, photographs, symbols, and the like.

Next, the data processing device 205 rasterizes the inputted data (or interprets PDL (Page Description Language) (step S402) and carries out attribute determination and object-base data separation (extraction) for the rasterized (or interpreted PDL) data (step S403).

As mentioned above, the image data inputted to the data processing device 205 and the rasterized image data include characters and figures. In other words, the image data is generally composed of one or more character data regions and one or more figure data regions. In the step S402, the one or more data regions that compose the image data are recognized and it is then determined whether the attribute of each data region is "character" or "figure". Each data region is then divided into one or more rectangular subregions as described later, an object corresponding to each data subregion is generated, and the resultant objects are separated from one another.

The data regions in the rasterized image data are recognized, for example, as described below. First, the image data is binarized to black and white data, clumps of black pixels are extracted from the binarized image, and the respective pixel clumps are recognized as characters or figures according to the size and shape of the pixel clumps. For example, if the height/width ratio and size of a pixel clump fall within respective predetermined ranges, the pixel clump can be recognized as corresponding to a character. A part where pixel clumps corresponding to characters are aligned can be recognized as a character region. On the other hand, a pixel clump of arbitrary shape can be recognized as corresponding to a figure. It is also possible to confirm whether or not the attribute of a recognized data region is "character" according to whether or not an image feature value is detected in the data region, for example, according to whether or not a character feature value (for example, a character code) is detected when the data region is subjected to OCR (Optical Character Recognition) process. Similarly, it is possible to confirm whether the attribute of a data region is "figure" based on image feature values such as a color feature value and a shape feature value.

Figure 5:
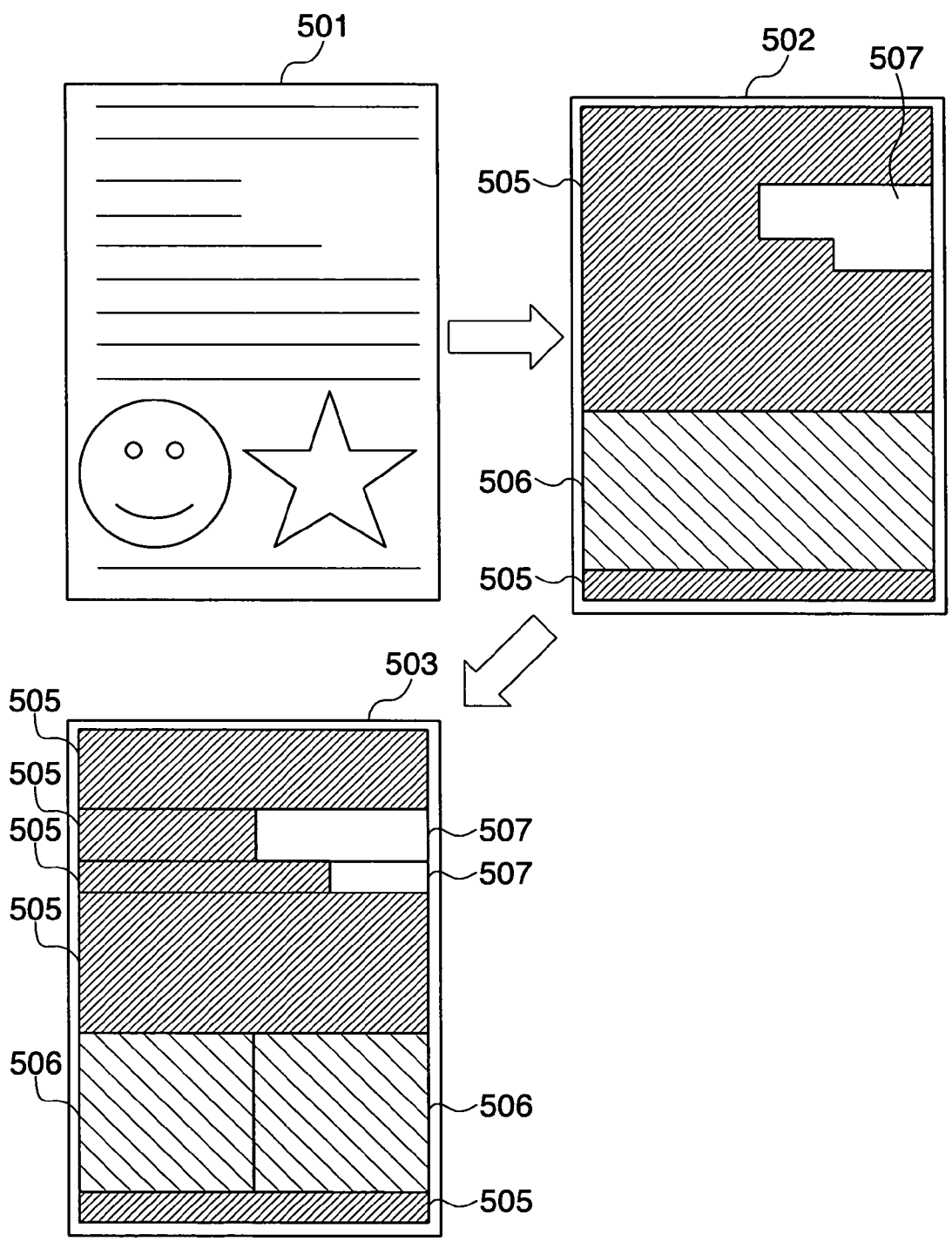
FIG. 5 is a diagram showing a specific example of determination of attributes and object-based data separation in a step S403 appearing in FIG. 4.

A specific example of the step S403 is shown in FIG. 5.

In FIG. 5, reference numeral 501 designates an initial state of data before objects have been determined. The horizontal lines on the data 501 represent characters.

In the step S403, first, the entire data 501 is analyzed to recognize the data regions composing the data 501 and then an attribute such as "character" or "figure" is determined for the respective data regions. In the case of rasterized data, as described above, attributes such as "character" and "figure" are determined from the image feature values of the respective data regions. On the other hand, in the case of interpreted PDL data, data regions are recognized and attributes such as "character" and "figure" are determined directly from position information, attribute information, and the like written in the respective data regions in the PDL data, for example.

Next, an empty region where there are no characters or figures is determined as having a "blank" attribute. That is, a region that is neither a "character" region nor a "figure" region is given the attribute "blank". In FIG. 5, reference numeral 502 designates the state of the data after the attributes have been determined. In the data 502, a data region designated by reference numeral 505 and shown with fine hatching has the "character" attribute, a data region designated by reference numeral 506 and shown with wide hatching has the "figure" attribute, and a data region designated by reference numeral 507 has the "blank" attribute.

Next, the data 502 for which the attributes have been determined is separated into objects. In FIG. 5, reference numeral 503 designates the state of the data after the separation into objects, i.e. object-based data separation. In the case of the data 503, four rectangular character objects are generated in an upper character data region 505 as viewed in FIG. 5, and these objects are divided from one another.

To generate character objects in the upper character data region 505, the upper character data region 505 is divided into four rectangular subregions with reference to their widths as seen in a left-right direction in FIG. 5, and then character objects corresponding to the rectangular subregions are generated. The widths of the first and fourth character objects from the top in the upper character data region 505 are equal to the data width (i.e., the entire width of the image data 503) or in other words the entire width of the printable region on a print sheet, while the widths of the second and third character objects are respectively around half and two-thirds of the data width.

In this way, the character data region is divided into one or more character objects in accordance with the widths of the objects, and as shown by the solid lines in FIG. 5, the character objects are separated from one another.

On the other hand, in FIG. 5, the lower character data region 505 is composed of a single character region whose width is equal to the entire width of the image data 503.

In the same way as the upper character data region 505, at least one rectangular blank object is generated in the blank data region 507 based on the widths of the objects and the blank objects are separated from one another. In FIG. 5, the blank data region 507 is composed of two blank objects.

Next, the figure data region 506 is divided into one or more figure objects on a figure-by-figure basis. In FIG. 5, two figure objects are generated in the figure data region 506 and these figure objects are separated from one another.

Figure 7:
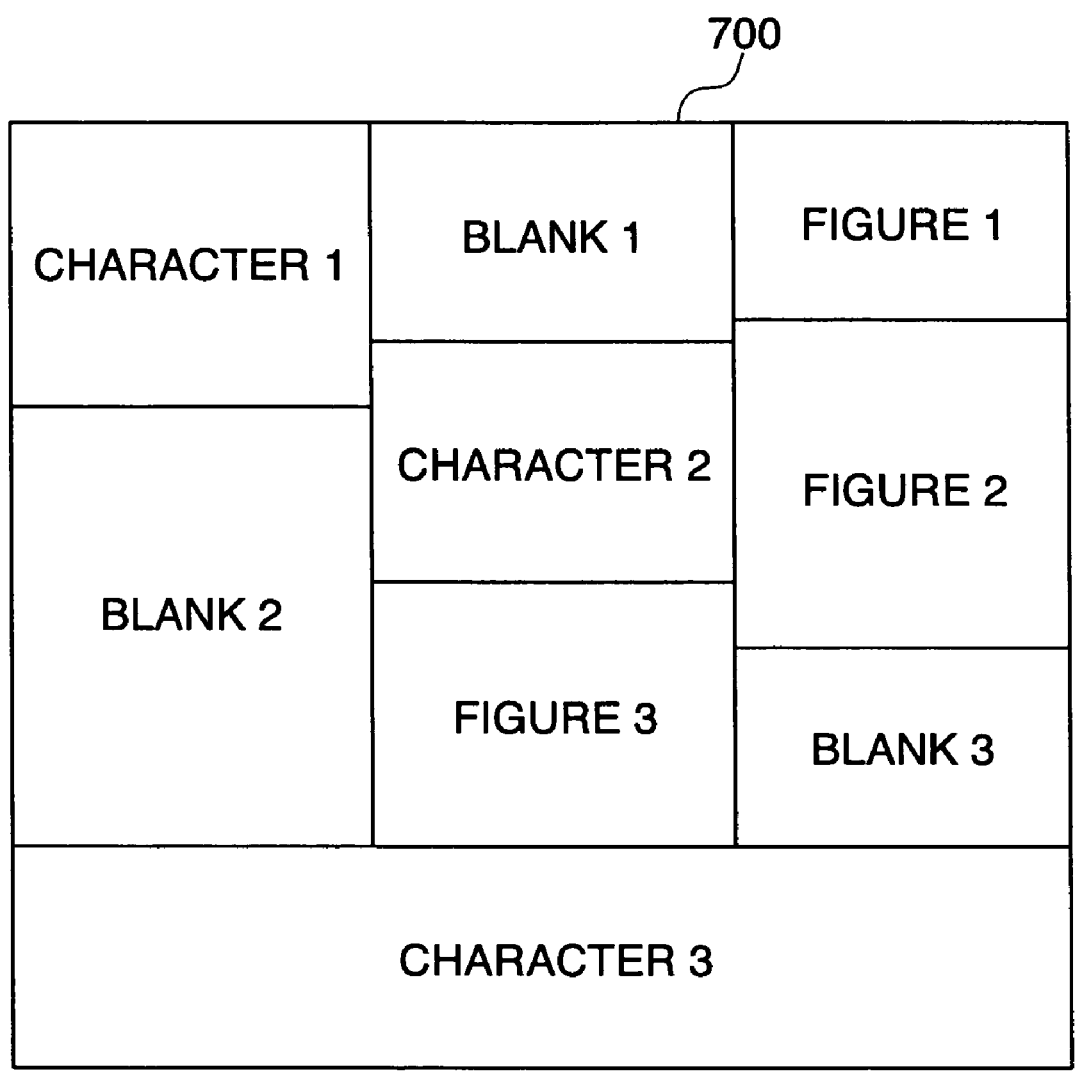
FIG. 7 is a diagram showing an initial state of data processed during execution of the process shown in FIG. 4.

After the object-based data separation has been made as described above, the data 503 is scanned at a predetermined width from left to right and from top to bottom starting at top left of the data and moving toward bottom right thereof, and calculations (countings) are made of the separated objects. Here, the sizes of the respective objects are calculated and the respective objects are numbered on attribute-by-attribute basis and in the order in which the objects are found during the scanning of the data 503. One example of data whose objects have thus been numbered is shown in FIG. 7. Note that the example in FIG. 7 does not correspond to the example shown in FIG. 5.

Although the two attributes "character" and "figure" are determined here, the present invention is not limited to this and any number of types of attributes may be determined. The method of determining the types of attributes of objects is also not limited to the method described above, and any method that can determine objects with the "blank" attribute can be used.

Referring again to FIG. 4, in a step S404, the objects to be moved during the automatic layout changing are determined. Here, the objects to be moved are objects with the "character" or "figure" attribute that was not selected by the setting of the "prioritized objects" 302 on the UI screen 300.

Next, in a step S405, size reduction of the respective objects to be moved is performed. Here, the objects to be moved are reduced in size in accordance with the reduction level set on the UI screen 300 shown in FIG. 3. Next, in a step S406, recalculation (recounting) of blank objects is carried out since new blank parts are produced in the data as a result of the size reduction of the objects to be moved in the step S405. In the recalculation of blank objects, the data is scanned from its top left to bottom right and new numbers are assigned to blank objects in the order in which the blank objects are found.

In steps S407 to S415, the print layout is adjusted.

In the step S407, one or more blank objects 507 are found and extracted from the data 503 that has been separated into objects. When a plurality of blank objects have been found, the blank objects are extracted one at a time in order. Next, it is determined whether or not it is necessary to move a first one of the objects intended to be moved into the extracted blank object (step S408). More specifically, it is determined whether or not one or more other objects present on a line alongside the extracted blank object are all blank objects, and when the answer to this determination is NO, that is, when a character object or a figure object is present alongside the blank object, it is determined that the object intended to be moved should be moved into the blank object.

As described later, in the present embodiment, wide blank parts that extend across the entire width of the image data are deleted from the image data, whereby a large reduction can be achieved in the sheets required for printing the image data. For this reason, when only blank objects are present alongside a blank object, that is, when one or more blank objects aligned in the width direction of the image data compose a wide blank whose width is equal to the entire width of the image data, movement of one or more objects to be moved into the one or more blank objects is inhibited as described above.

A specific example of the step S408 described above is shown in FIG. 6.

Figure 6:
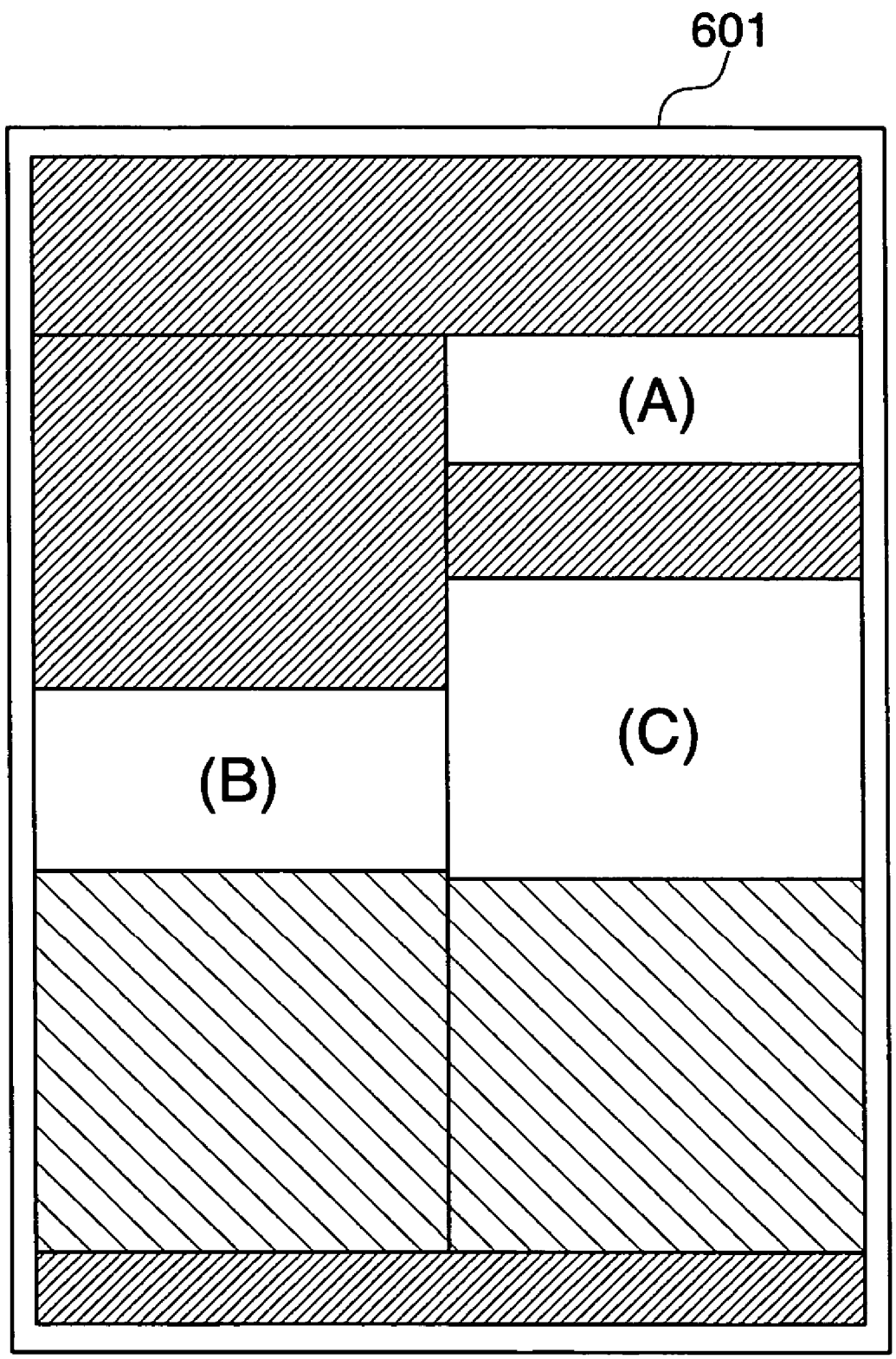
FIG. 6 is a diagram showing a specific example of determination of whether movement to a blank object is necessary in a step S408 appearing in FIG. 4.

In FIG. 6, reference numeral 601 designates the state of data after the object-based data separation. The parts indicated by fine hatching represent character objects and parts indicated by wide hatching represent figure objects. Symbols (A), (B), and (C) designate blank objects.

A character object is present alongside the blank object (A) and therefore it is determined that movement of an object to be moved into the blank object (A) is possible. In addition to the blank object (B), a character object is present alongside the blank object (C) and therefore it is determined that movement of an object to be moved into the blank object (C) is possible. On the other hand, since only the blank object (C) is present alongside the blank object (B), it is determined that it is not necessary to move an object to be moved into the blank object (B).

Referring again to FIG. 4, if as a result of the determination in the step S408, it is not necessary to move an object to be moved to the extracted blank object, the process proceeds to a step S414. On the other hand, if it is necessary to move an object, the process proceeds to a step S409.

In the step S409, a search is carried out for an object to be moved of a smaller size than the extracted blank object. This search is carried out by scanning the data separated into objects from top left to bottom right. If one or more objects to be moved have been found ("YES" to a step S410), the process proceeds to a step S411, while if no object has been found ("NO" to the step S410), the process proceeds to the step S414.

In the step S411, an optimal object for movement into the blank object is selected from the one or more objects to be moved that were found. Here, if "order prioritized" is set in the "details" 304 on the UI screen 300, the first, out of the found objects to be moved that fit in the blank object, is selected. On the other hand, if "sheet-saving prioritized" is set, focus is placed on the widths of the found objects to be moved and an object to be moved with a width that is closest to the width of the extracted blank object is selected.

Next, in a step S412, the object to be moved is moved to the position of the blank object. Since new blank parts are produced when the object to be moved is moved, the blank objects are recalculated in the same way as the processing in the step S406 (step S413) and the process proceeds to the step S414.

In the step S414, it is determined whether all of the objects to be moved in the data separated into objects have been found, and when all of the objects have not been found, the process returns to the step S407 and the searching for and extracting of a blank object are carried out again. Note that when the process returns to the step S407 and the processing is repeated, the processing is not carried out on blank objects that have already been found and objects that have already been moved.

On the other hand, if as a result of the determination in the step S414, all of the objects to be moved have been found, the layout is adjusted by deleting blank parts (step S415), and the present process is terminated. The deletion of the blank parts is carried out by scanning all of the objects irrespective of the priority set on the UI screen 300, and when a wide blank object with a width equal to the entire data width is present above an object, such blank object is deleted.

A specific example of the procedure shown in FIG. 4 is shown in FIGS. 7 to 14. In the present example, "characters" is selected as the "prioritized objects" 302, "80%" is set as the reduction ratio by the "reduction level" bar 303, and "order prioritized" is selected in the "details" 304.

In FIG. 7, data 700 shows the state of data after the processing in the steps S401 to S404 in FIG. 4 has been carried out. Three character objects, "character 1", "character 2", and "character 3" and three figure objects, "figure 1", "figure 2", and "figure 3" are present in the data 700, and three blank objects "blank 1", "blank 2", and "blank 3" are present due to the arrangement of the character and figure objects. The respective objects are numbered sequentially in the order in which they have been found by scanning the data 700 from top left to bottom right.

Next, since "characters" has been selected in advance in the selection of the "prioritized objects" 302 on the UI screen 300, "figures" not selected are reduced in size. Figures newly produced by reducing "figure 1" to "figure 3" to 80% of the respective original sizes are shown by wide hatching in FIG. 8.

Figure 8:
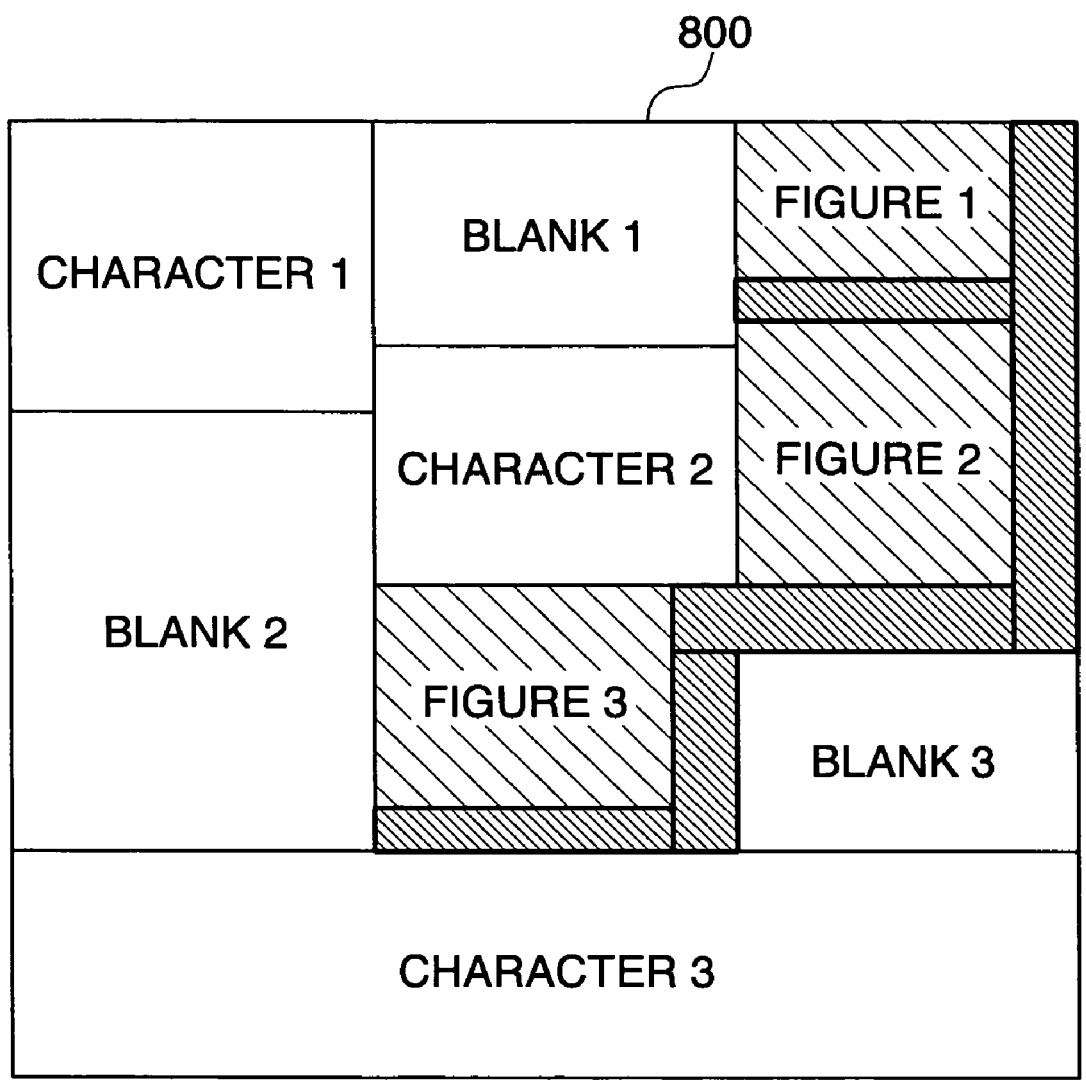
FIG. 8 is a diagram showing the data in a state where figures have been reduced in size.

In FIG. 8, data 800 corresponds to the data 700 after the processing in the step S405 in FIG. 4. Since new blank parts (shown by fine hatching) are produced in the data 700 as a result of size reduction of "figure 1" to "figure 3", the blank objects are recalculated. Data after the blank objects have been recalculated is shown in FIG. 9.

Figure 9:
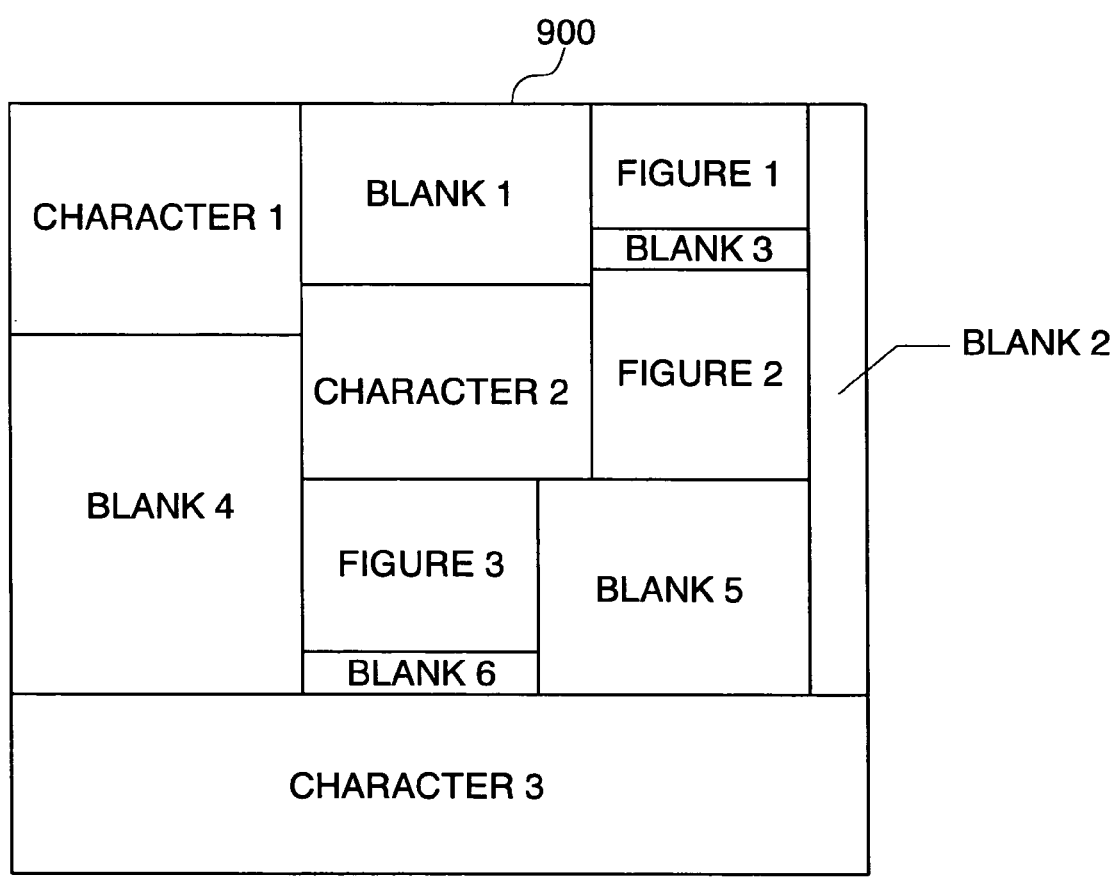
FIG. 9 is a diagram showing the data in a state after blank objects have been recalculated after the figures have been reduced.

In FIG. 9, data 900 corresponds to the data 700 after the processing in the step S406 in FIG. 4. Following the recalculation of the blank objects, the data 900 is scanned from top left to bottom right and new numbers are assigned to the blank objects in the order in which they are found.

Figure 10:
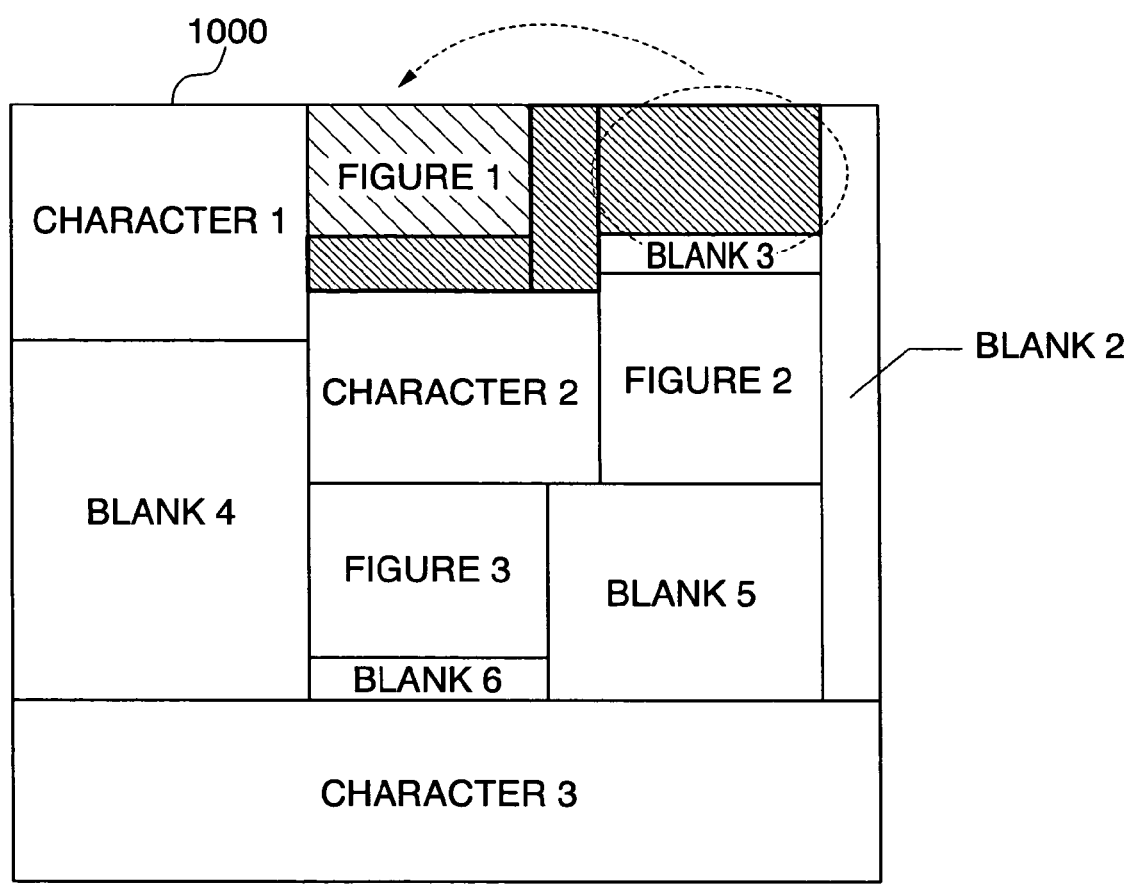
FIG. 10 is a diagram showing the data shown in FIG. 9 in a state after "figure 1" has been moved to "blank 1"

FIG. 10 is a diagram showing the state (data 1000) after "figure 1" in the data 900 shown in FIG. 9 has been moved to "blank 1".

The data 1000 shown in FIG. 10 corresponds to the data 700 after the processing in the steps S407 to S412 in FIG. 4. First, the blank objects are searched in the data 900 (step S407) and "blank 1" is extracted. Here, since the character object "character 1" is present to the left of "blank 1", it is determined that it is necessary to move an object to be moved to "blank 1" (step S408). Next, a search is carried out for objects to be moved that fit in the "blank 1". Here, "figure 1" and "figure 3" are found (step S409). Next, the optimal object is selected from these objects (step S411). Here, since "order prioritized" is selected in the "details" 304, "figure 1" first found becomes the object to be moved and "figure 1" is moved to "blank 1" (step S412). In FIG. 10, parts that have been finely hatched show blanks newly produced by the movement of "figure 1".

Figure 11:
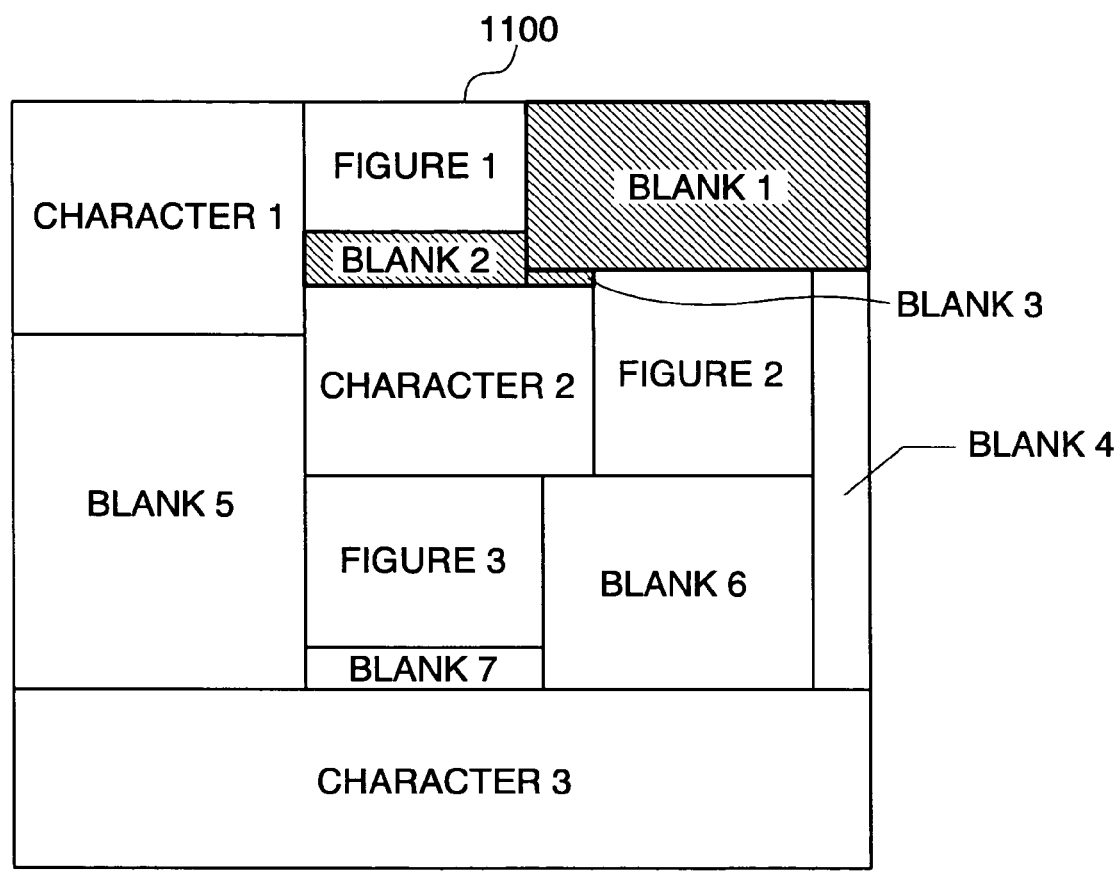
FIG. 11 is a diagram showing the data in a state after blank objects have been recalculated following movement of "figure 1"

The data 700 after the processing in the step S413 in FIG. 4 is shown in FIG. 11.

In FIG. 11, data 1100 shows the state of the data 1000 after the blank objects have been recalculated (step S413). Here, in the same way as the step S406, recalculation is carried out for rectangles with reference to object width. As a result, blank objects 1 to 4 are newly produced. Blank objects 5 to 7 in FIG. 11 respectively correspond to the blank objects 4 to 6 in FIG. 10.

Figure 12:
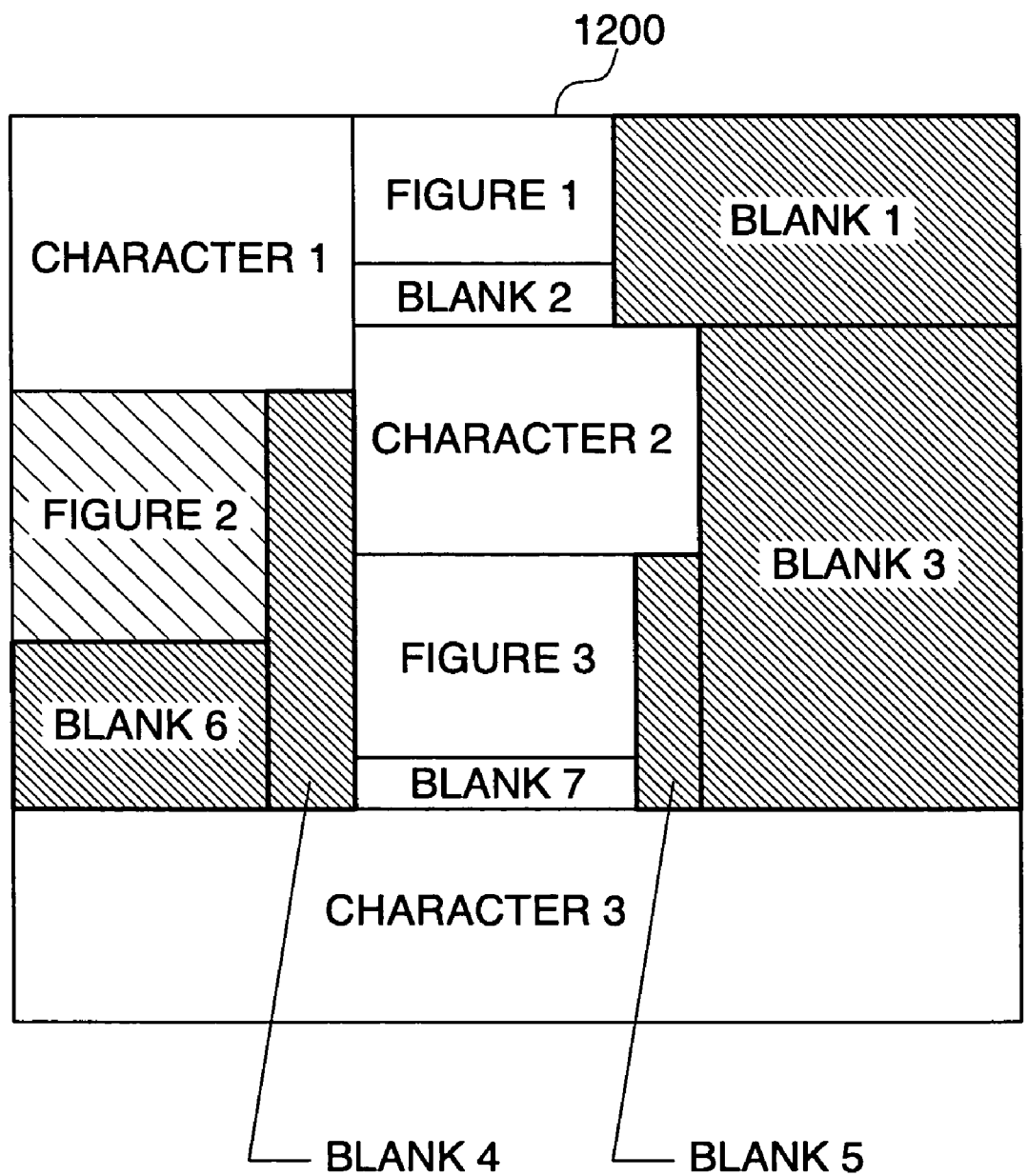
FIG. 12 is a diagram showing the data shown in FIG. 11 in a state after blank objects have been recalculated following movement of "figure 2"

Next, the result of moving "figure 2" in the data 1100 and recalculation the new blank objects is shown in FIG. 12 as data 1200. The result of moving "figure 3" in the data 1200 and recalculation the new blank objects is shown in FIG. 13 as data 1300.

Note that since "order prioritized" is selected in the "details" 304 as described above in the present example, the figures are moved in the order "figure 1", "figure 2", and then "figure 3", but when priority is given to sheet-saving efficiency, the result differs. When priority is given to sheet-saving efficiency, the width of a blank object and the widths of the objects to be moved (here, figure objects) are compared, an object to be moved with a closest width to the width of the blank object is extracted, and the extracted object is moved to the blank object. When priority is given to sheet-saving efficiency in the example shown in FIG. 12, since the width of "figure 3" is wider than the width of "figure 2" and is closer to the width of "blank 2" than the width of "figure 2", "figure 3" is moved to "blank 2".

Figure 14:
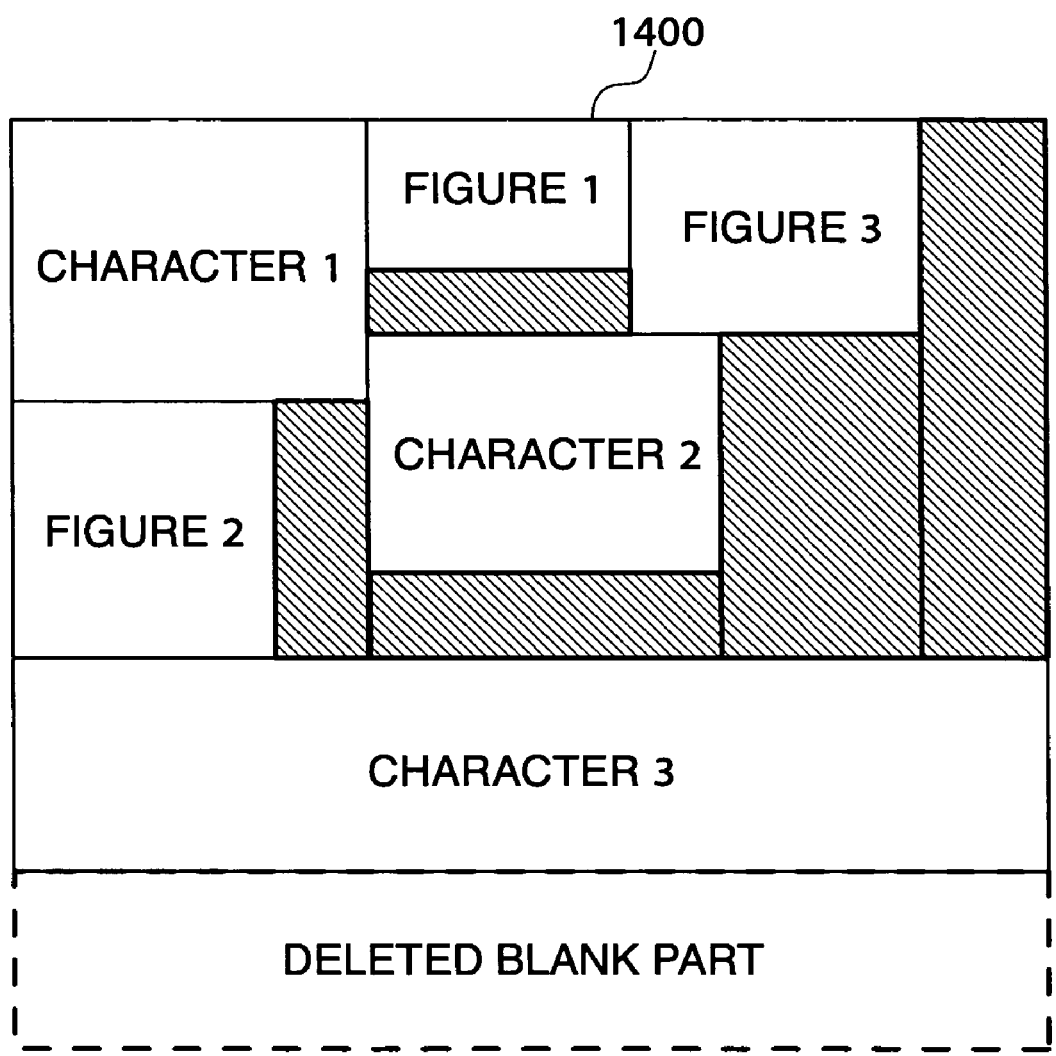
FIG. 14 is a diagram showing the data shown in FIG. 13 after deletion of a blank part.

FIG. 14 is a diagram showing the data after the processing in the step S415 of FIG. 4.

Figure 13:
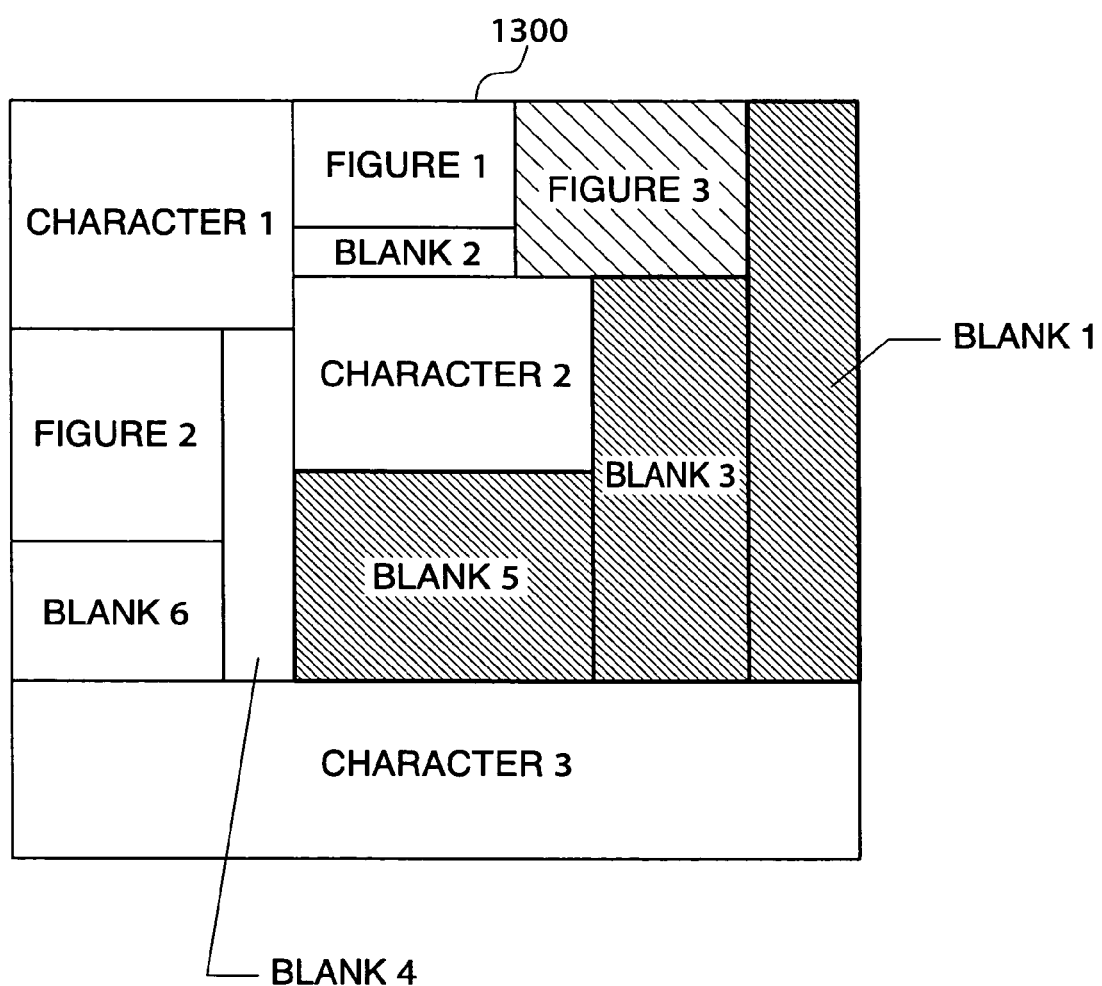
FIG. 13 is a diagram showing the data shown in FIG. 12 in a state after movement of "figure 3" and the blank objects have been recalculated.

In FIG. 14, data 1400 shows the state where a wide blank part (composed of parts of the "blank 1", "blank 3", "blank 4", and "blank 5" and all of "blank 6" shown in FIG. 13) with a width equal to the entire data width has been deleted from the data 1300 shown in FIG. 13. Here, irrespective of the setting of the "prioritized objects" 302, all of the character and figure objects are scanned, any wide blank parts located above character and/or figure objects are deleted and the character and/or figure objects are moved upward. In FIG. 14, since a wide blank part is present above "character 3", the blank is deleted and "character 3" is moved.

According to the first embodiment described above, print layout is automatically changed by rasterizing (or PDL interpreting) inputted data, determining the attributes "character", "figure", and "blank", separating the data into objects, reducing the sizes of objects that are to be moved due to having a low priority (importance) for layout and printing that is set in advance, finding blank objects in data in which new blanks have been generated due to the objects being reduced in size, moving the reduced objects to the found blank objects, and deleting wide blank parts, out of the blank parts generated in the data, with a width equal to the entire data width after the movement has been completed for all the objects to be moved. As a result, unnecessary blank parts in the print data can be removed, so that sheet saving and efficient printout can be achieved at the time of printing and/or copying.

In addition, since only the required information on such as figures and characters can be extracted when printing a Web page or the like, it is possible to increase user convenience.

Although in the first embodiment described above, the control program for the image processing system to perform the automatic print layout changing process is incorporated in the printer driver, the present invention is not limited to this and the control program may be installed in the MFP 101 or the SFP 102, for example. In this case, when setting conditions for the automatic print layout changing and the like are valid in the printer driver, the MFP 101 or the SFP 102 that has received print data carries out the automatic print layout changing process on the received print data in accordance with the setting conditions and then prints out images.

Next, a second embodiment of the present invention will be described.

An image processing system according to the second embodiment has fundamentally the same construction as the first embodiment described above, and therefore corresponding elements are designated by identical reference numerals and description thereof is omitted.

While the first embodiment described above carries out an automatic print layout changing process for printing, the second embodiment carries out an automatic print layout changing process for copying.

Unlike the process during printing, the automatic changing process for print layout during copying is carried out not by the client PC 103 (or the client PC 104) but by the MFP 101 or the SFP 102 with a scanner, not shown, connected thereto. That is, the control program for carrying out the process is incorporated not in a printer driver but as a part of the basic functions of the MFP 101 or the SFP 102. The control section of the data processing device 205 in the MFP 101 or the SFP 102 therefore reads and executes a control program stored in the storage device 202, whereby the UI screen 300 is displayed on the display device 204.

Figure 15:
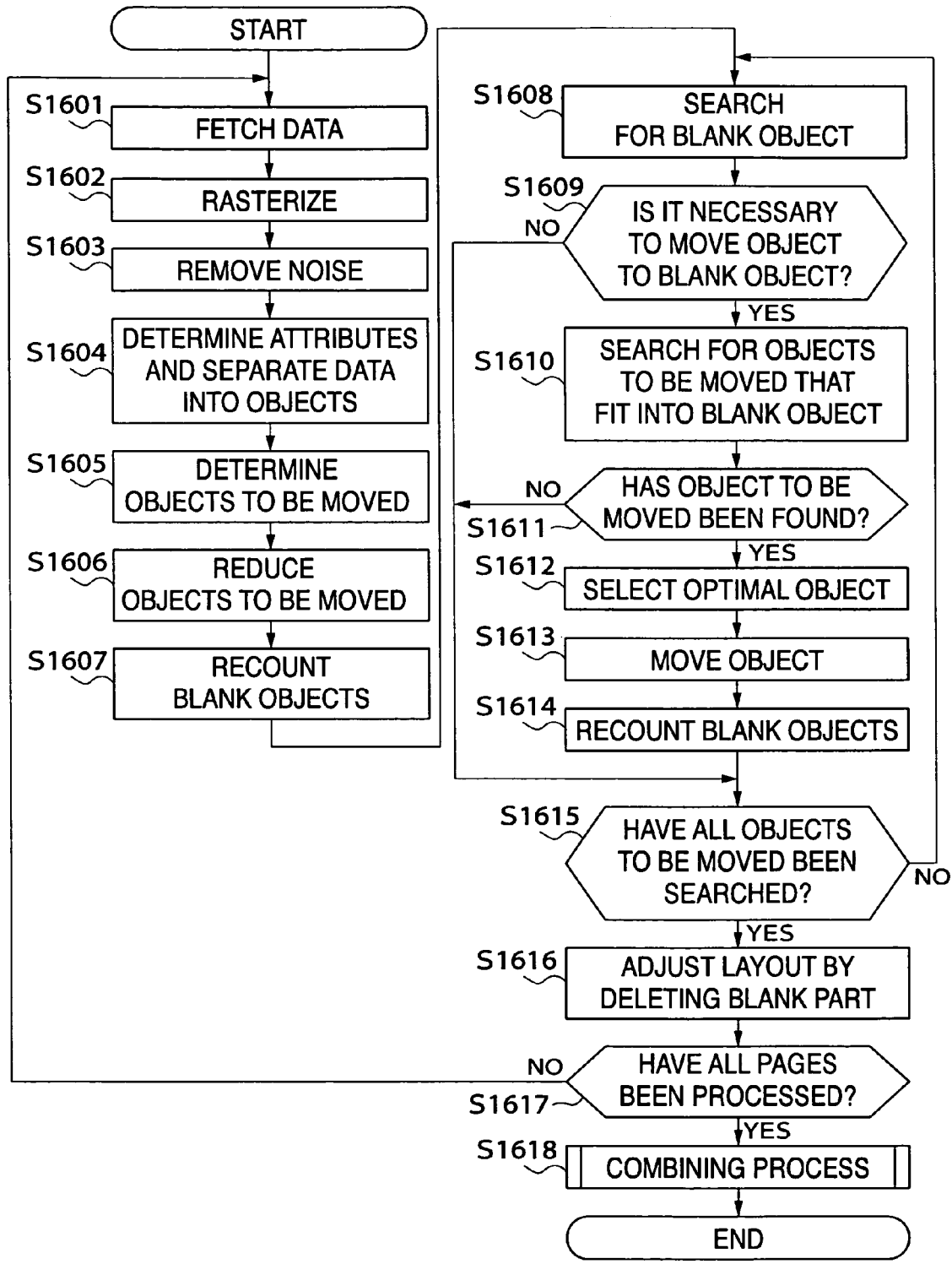
FIG. 15 is a flowchart showing the procedure of an automatic print layout changing process carried out by an image processing system according to a second embodiment of the present invention.

FIG. 15 is a flowchart showing the procedure of the automatic print layout changing process carried out by the image processing system according to the second embodiment.

In the case where an original is copied by the MFP 101 or the SFP 102 with a scanner, connected thereto, unlike the case where data is received from the client PC 103 or the like and printed, there is the possibility of "noise" being produced in the image data of the read original due to the effect of dirt and the like on the platen glass. When such noise is recognized as a character object or a figure object, it may become difficult to optimally change the layout and the processing time may be increased. For this reason, in the present process, noise reduction is carried out before the data is subject to the attribute determination and object-based separation.

In the present process, when a multiple-page original is copied, data from which blank objects have been deleted and for which the layout change has been made is stored in page units in the storage device 202, and such data is then combined and copy-printed. Compared to the case where the layout of an original is changed page by page and each page of the original is copy-printed on a sheet, combining the print data for a plurality of pages of the original and then copy-printing the combined data is more effective from the viewpoint of sheet saving.

As shown in FIG. 15, first, in a step S1601, data of an original read by the image reading device 201 and stored in the storage device 202 is fetched. Here, in the case where a multiple-page original has been read at a time using the ADF, data for multiple pages is stored in the storage device 202. Therefore, one page of data is fetched from the data.

Next, the fetched data is rasterized (step S1602) and noise in the data is removed by carrying out a filter process or the like on the rasterized data (step S1603). Next, in steps S1604 to S1616, the same processing as in the steps S403 to S415 of FIG. 4 is carried out.

In a step S1617, after layout adjustment of the data has been carried out by the processing in the steps S1601 to S1616, it is determined whether all of the data temporarily stored in the storage device 202 has been processed. If it is determined that unprocessed data remains, the process returns to the step S1601. On the other hand, if all of the data has been processed, the process proceeds to a step S1618, where a combining process is carried out on the data.

In the combining process, data is joined up so as to produce the minimum possible amount of blank parts. In this way, according to the present embodiment, data whose layout has been adjusted are joined up, and as a result, unlike the conventional copying method that requires thirty sheets when copying a thirty-page original, for example, the data can be printed out using fewer sheets.

According to the second embodiment described above, since noise, which occurs in the read image data for originals due to dirt and the like present on the platen glass, is removed as unnecessary for printing, in addition to the effect of the MFP 101 in the first embodiment described above, it is possible to avoid misrecognition of noise as objects, to thereby optimally carry out the changing of print layout and avoid increases in processing time. Moreover, when a multiple-page original is copied, it is possible to reduce the number of copy sheets used.

An image processing system according to a third embodiment has fundamentally the same construction as the first embodiment described above, and therefore corresponding elements are designated by identical reference numerals and description thereof is omitted. Only parts that differ from the first embodiment described above will be described.

Next, a third embodiment of the present invention will be described.

Figure 16:
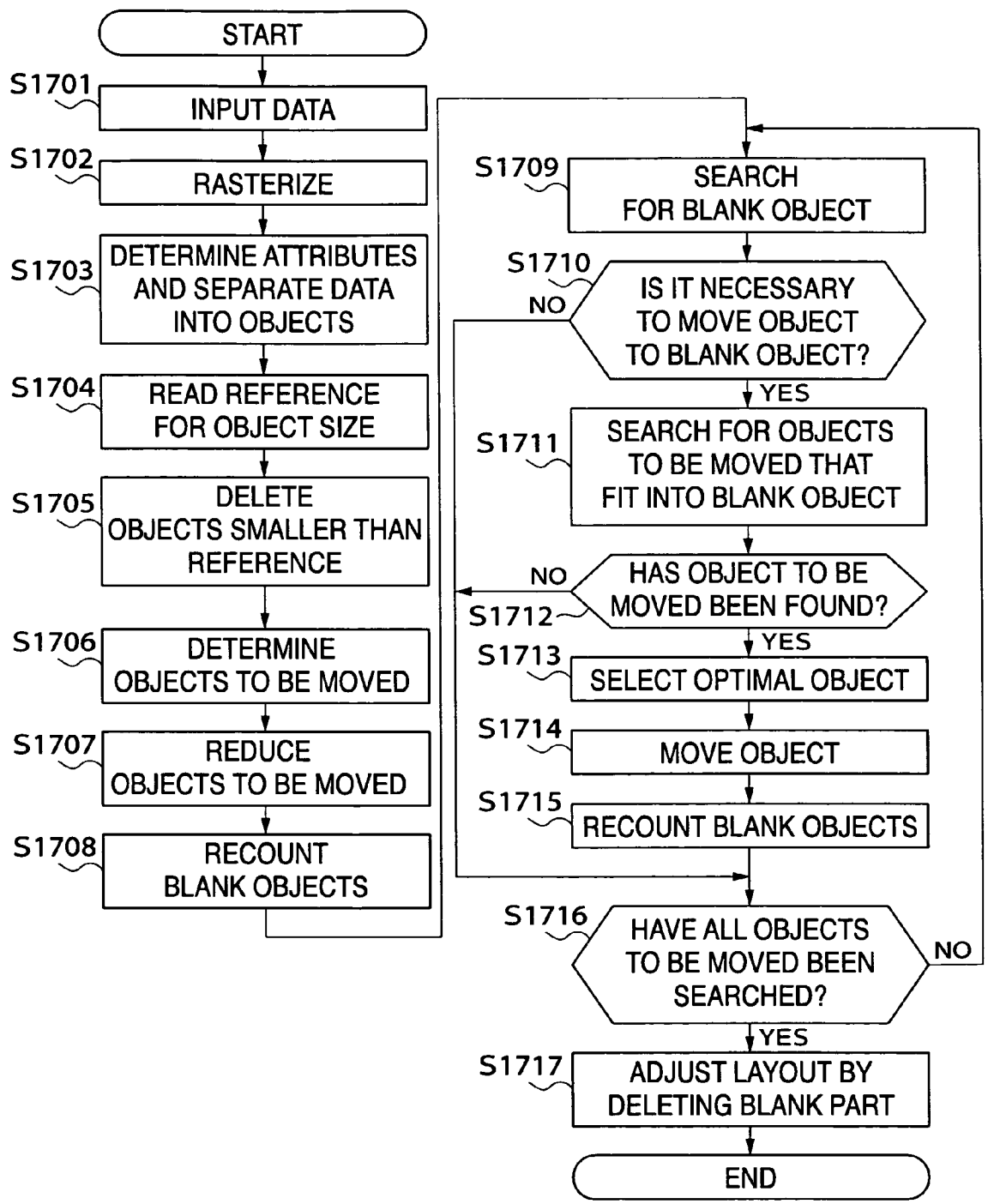
FIG. 16 is a flowchart showing the procedure of an automatic print layout changing process carried out by an image processing system according to a third embodiment of the present invention.

FIG. 16 is a flowchart showing the automatic print layout changing process carried out by the image processing system according to the third embodiment.

In this process, during printing, a reference object size is set in advance on the UI screen 300, and when objects that are smaller than the set reference object size are present, it is determined that such small objects do not need to be printed, and are replaced with blank objects. Note that instead of replacing the small objects with blank objects, the small objects may be combined to produce a larger object.

As shown in FIG. 16, after the same processing as the steps S401 to S403 in FIG. 4 has been carried out (steps S1701 to S1703), the reference object size is read (step S1704). This reference object size is determined based on a setting made by the user on the UI screen 300 or inputted information, for example.

Next, in a step S1705, all objects of a smaller size than the reference object size are deleted, i.e. replaced with blank objects. As a result, the total number of objects in the data falls, thereby improving the sheet-saving efficiency when changing the layout. Since the number of objects to be moved also falls, the processing time can also be reduced. Next, steps S1706 to S1717 carry out the same processing as in the steps S404 to S415 in FIG. 4.

According to the third embodiment described above, the reference object size is set on the UI screen 300, and when objects that are smaller than the reference object size set in advance are present among the separated objects, the objects that are smaller than the reference object size are replaced with blank objects or combined to produce a larger object, so that in addition to the sheet-saving reducing effect achieved by the automatic layout changing according to the first embodiment described above, the total number of objects in the data and the number of objects to be moved in the data can be decreased, making it possible to improve the efficiency of the layout changing operation and shorten the processing time. Also, since the sizes of blank objects are increased, the readability of the printed image can be improved.

Although the third embodiment carries out the process at the time of printing, the third embodiment can also be applied to the process at the time of copying shown in FIG. 15. In this case, information relating to the reference object size is first read, the reference object size is set based on such information, and at the same time as the removal of noise in the step S1603, objects smaller than the reference object size are deleted.

Figure 17:
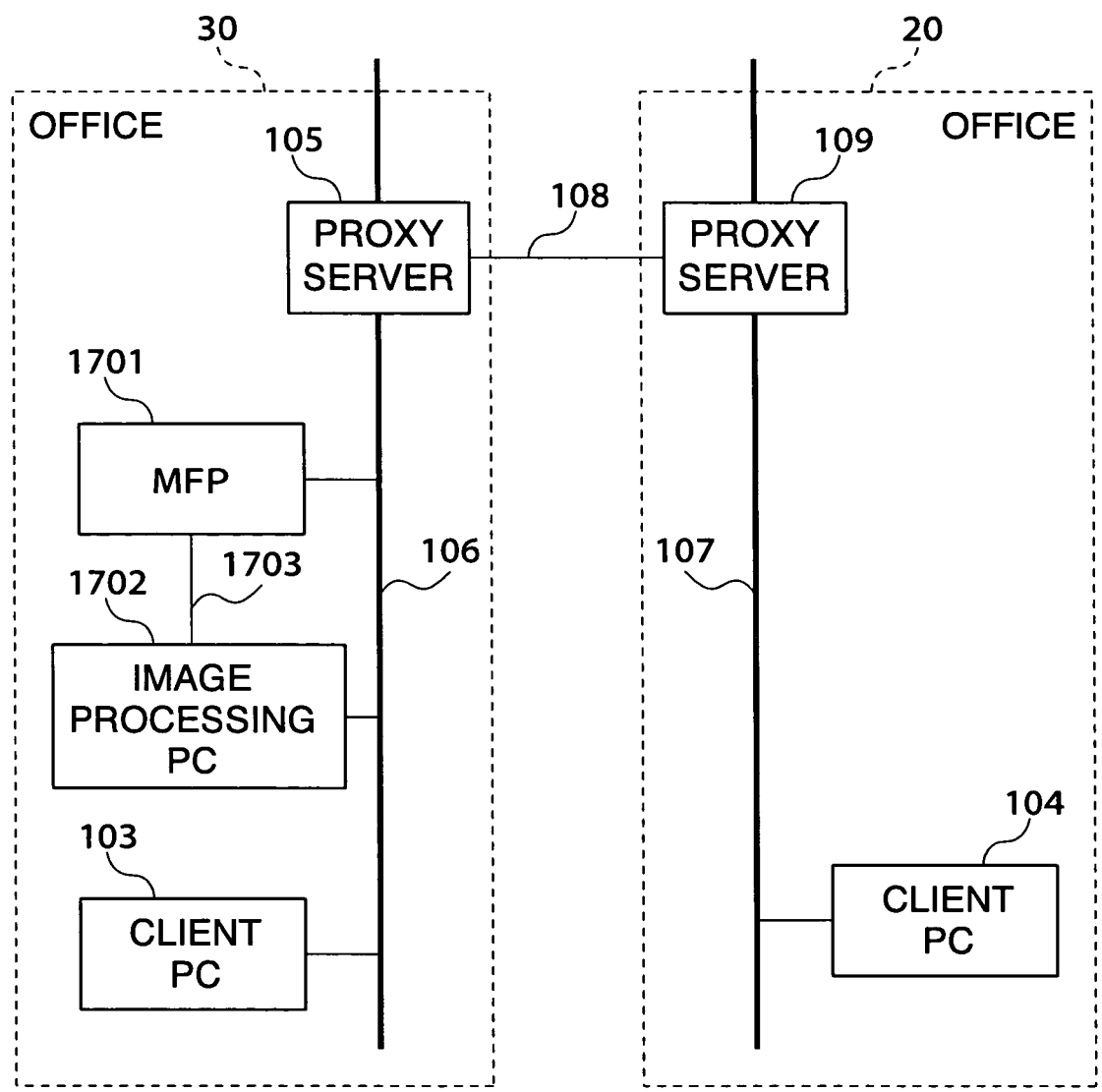
FIG. 17 is a block diagram showing the overall construction of another example of an image processing system shown in FIG. 1.

Although the first to third embodiments are applied to the image processing system shown in FIG. 1, these embodiments may also be applied to an image processing system shown in FIG. 17. That is, in FIG. 17, some of the functions of the data processing device 205 have been assigned to an image processing PC 1702. The image processing PC 1702 can also have the functions of the display device 204 and the inputting device 206.

In FIG. 17, the image processing PC 1702 receives print data from the client PC 103, carries out image processing, and then transmits the print data to a MFP 1701 via a cable 1703 directly connected to the image processing PC 1702 or via the LAN 106.

Although in the first to third embodiments, the object-based data separation is carried out by dividing data parts into rectangles with reference to data width, the present invention is not limited to this and any separation method may be used. In addition, although two types of objects, "characters" and "figures" are used as the objects other than "blanks", which are not limitative and may be other types of objects, such as "tables" and "photographs" (images). Also, although the objects to be moved are reduced by a predetermined reduction ratio, the present invention is not limited to this and objects may be enlarged by a predetermined enlargement ratio.

Also, although in the first to third embodiments described above, the priority is set by selecting "characters" or "figures" in the "prioritized objects" 302 on the UI screen 300, the priority may be set by selecting other types of objects, such as "tables" and "photographs" (images). In addition, although the priority is set by selecting either "order" or "sheet saving" in the "details" 304 on the UI screen 300, any other items may be set.

Also, although scanning for objects is performed from top left to bottom right of the data, scanning may be carried out in any other manner.

It is to be understood that the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read out from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the medium, such as a storage medium, into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-231241 filed Aug. 6, 2004, which is hereby incorporated by reference herein.

What is claimed is:

1. An image processing system including at least one image forming apparatus, and at least one information processing apparatus,
   wherein data is transmitted from the information processing apparatus to the image forming apparatus, to carry out printing by the image forming apparatus based on the data,
   wherein the information processing apparatus comprises:
   a data input device that inputs data;
   an extracting device that extracts at least one object from the data inputted by said input device;
   a designating device that designates at least one object to be reduced or enlarged, out of the extracted object;
   an object scaling device that reduces or enlarges the object designated by said designating device;
   a searching device that searches the data including the reduced or enlarged object to find at least one blank part in the data;
   a priority input device that inputs whether the object-appearance order is to be prioritized or the sheet-saving efficiency is to be prioritized;
   an object moving device that moves the reduced or enlarged object to the found blank part in accordance with inputting by the priority input device, wherein when the priority input device inputs that the sheet-saving efficiency is to be prioritized, the object moving device moves an object which is closest in size to the found blank part to the found blank part with the sheet-saving efficiency prioritized; and
   a deleting device that deletes a blank part generated on the data from the data after the reduced or enlarged object has been moved.

2. An image processing system according to claim 1, wherein:
   the information processing apparatus further comprises an attribute determining device that determines respective attributes of parts of the data inputted by said data input device, and
   said extracting device generates at least one object from each of the respective parts of the data whose attributes have been determined by said determining device.

3. An image processing system according to claim 2, wherein said attribute determining device analyzes data obtained by rasterizing the inputted data and determines an attribute of each of at least one data part composing the rasterized data based on an image feature value of each of the at least one data part.

4. An image processing system according to claim 2, wherein:
   the data is PDL (Page Description Language) data; and
   said attribute determining device interprets the PDL data and determines an attribute of each of at least one data part composing the PDL data based on information written in the PDL data.

5. An image processing system according to claim 2, wherein said attribute determining device determines that the blank part has a blank attribute.

6. An image processing system according to claim 5, wherein said extracting device generates at least one blank object from the blank part determined as having the blank attribute.

7. An image processing system according to claim 6, wherein said searching device searches for the blank part by searching the blank object.

8. An image processing system according to claim 2, wherein:
   the information processing apparatus further comprises an importance level setting device that sets an importance level of the object in advance in accordance with the attribute of the data part from which the object is generated; and
   said designating device designates the object to be reduced or enlarged in accordance with the importance level set by said importance level setting device.

9. An image processing system according to claim 6, further comprising:
   a selecting device that selects an optimal object for movement to the found blank part, out of the at least one reduced or enlarged object; and
   a recalculating device that recalculates at least one blank object from the blank part generated on the data after the reduced or enlarged object has been moved.

10. An image processing system according to claim 9, wherein:
    the blank object is rectangular in shape; and
    said deleting device deletes at least one blank object of a predetermined width out of the recalculated at least one blank object.

11. An image processing system according to claim 10, wherein said deleting device deletes a blank object, out of the recalculated at least one blank object, that is adjacent to an object having an attribute other than the blank attribute.

12. An image processing system according to claim 2, wherein said attribute determining device determines that, out of the parts of the data, at least one data part including characters has a character attribute and at least one data part including at least one figure has a figure attribute.

13. An image processing system according to claim 6, wherein said extracting device replaces an object, out of the extracted at least one object, that is smaller than a size set in advance, with a blank object.

14. An image forming apparatus that carries out printing, comprising:
    a data input device that inputs data;
    an extracting device that extracts at least one object from the data inputted by said data input device;
    a designating device that designates at least one object to be reduced or enlarged, out of the at least one object extracted by said extracting device;
    an object scaling device that reduces or enlarges the object designated by said designating device;
    a searching device that searches the data including the reduced or enlarged object to find at least one blank part in the data;
    a priority input device that inputs whether the object-appearance order is to be prioritized or the sheet-saving efficiency is to be prioritized;
    an object moving device that moves the reduced or enlarged object to the found blank part in accordance with inputting by the priority input device, wherein when the priority input device inputs that the sheet-saving efficiency is to be prioritized, the object moving device moves an object which is closest in size to the found blank part to the found blank part with the sheet-saving efficiency prioritized; and a deleting device that deletes a blank part generated on the data from the data after the reduced or enlarged object has been moved.

15. An image forming apparatus according to claim 14, further comprising:

an attribute determining device that determines respective attributes of parts of the data inputted by said data input device, and wherein said extracting device generates at least one object from each of the respective parts of the data whose attributes have been determined by said determining device.

16. An image forming apparatus according to claim 15, wherein said attribute determining device removes noise that does not need to be printed from the analyzed data.

17. An image forming apparatus according to claim 15, wherein said extracting device replaces an object, out of the extracted at least one object, that is smaller than a size set in advance, with a blank object.

18. A control method for an image forming apparatus having a computer programmed to execute the method steps of controlling printing comprising:

a data inputting step of inputting data;

an extracting step of extracting at least one object from the data inputted in said data inputting step;

a designating step of designating at least one object to be reduced or enlarged, out of the at least one object extracted in the extracting step;

an object scaling step of reducing or enlarging the object designated in said designating step;

a searching step of searching the data including the reduced or enlarged object to find at least one blank part in the data;

a priority input step of inputting whether the object-appearance order is to be prioritized or the sheet-saving efficiency is to be prioritized;

an object moving step of moving the reduced or enlarged object to the found blank part in accordance with inputting in the priority input step, wherein when the priority input step inputs that the sheet-saving efficiency is to be prioritized, the object moving step moves an object which is closest in size to the found blank part to the found blank part with the sheet-saving efficiency prioritized; and a deleting step of deleting a blank part generated on the data from the data after the reduced or enlarged object has been moved.

19. A computer-readable storage medium storing a computer program executable by a computer for controlling an image forming apparatus that carries out printing, the computer program comprising:

a data inputting module for inputting data;

an extracting module for extracting at least one object from the data inputted by said data input module;

a designating module for designating at least one object to be reduced or enlarged, out of the at least one object extracted by the extracting module;

an object scaling module for reducing or enlarging the object designated by said designating module;

a searching module for searching the data including the reduced or enlarged object to find at least one blank part in the data;

a priority input module for inputting whether the object-appearance order is to be prioritized or the sheet-saving efficiency is to be prioritized;

an object moving module for moving the reduced or enlarged object to the found blank part in accordance with inputting in the priority input module, wherein when the priority input module inputs that the sheet-saving efficiency is to be prioritized, the object moving module moves an object which is closest in size to the found blank part to the found blank part with the sheet-saving efficiency prioritized; and a deleting module for deleting a blank part generated on the data from the data after the reduced or enlarged object has been moved.

* * * * *